United States Patent
Fukuta

(10) Patent No.: US 10,302,898 B2
(45) Date of Patent: May 28, 2019

(54) IMAGING LENS SYSTEM, IMAGING OPTICAL DEVICE, AND DIGITAL APPLIANCE

(71) Applicant: KONICA MINOLTA, INC., Chiyoda-ku (JP)

(72) Inventor: Yasunari Fukuta, Chiyoda-ku (JP)

(73) Assignee: KONICA MINOLTA, INC., Tokyo (JP)

( * ) Notice: Subject to any disclaimer, the term of this patent is extended or adjusted under 35 U.S.C. 154(b) by 141 days.

(21) Appl. No.: 15/378,279

(22) Filed: Dec. 14, 2016

(65) Prior Publication Data

US 2017/0176709 A1  Jun. 22, 2017

(30) Foreign Application Priority Data

Dec. 16, 2015  (JP) .................................. 2015-245003

(51) Int. Cl.
| | |
|---|---|
| *G02B 5/00* | (2006.01) |
| *G02B 7/08* | (2006.01) |
| *G02B 9/64* | (2006.01) |
| *G02B 13/00* | (2006.01) |
| *G02B 13/04* | (2006.01) |

(Continued)

(52) U.S. Cl.
CPC .............. *G02B 7/08* (2013.01); *G02B 5/005* (2013.01); *G02B 9/64* (2013.01); *G02B 13/0045* (2013.01); *G02B 13/04* (2013.01); *G02B 13/18* (2013.01); *G02B 27/0025* (2013.01)

(58) Field of Classification Search
CPC ...... G02B 13/18; G02B 3/04; G02B 13/0045; G02B 13/004; G02B 13/0035; G02B 27/0025; G02B 9/34; G02B 9/60; G02B 13/006; G02B 13/0015; G02B 13/06;

(Continued)

(56) References Cited

U.S. PATENT DOCUMENTS

| | | | | |
|---|---|---|---|---|
| 6,614,599 B1 * | 9/2003 | Watanabe | ............ | G02B 15/177 359/680 |
| 2012/0293879 A1 * | 11/2012 | Hayashi | ............ | G02B 13/02 359/786 |

FOREIGN PATENT DOCUMENTS

| | | | | |
|---|---|---|---|---|
| JP | 2014-048488 | * | 3/2014 | ............ G02B 13/04 |
| JP | 2014-238608 | * | 12/2014 | ............ G02B 13/00 |

OTHER PUBLICATIONS

JPO 2014-048488 English machine translation.*
JPO 2014-238608 English machine translation.*

* cited by examiner

*Primary Examiner* — Thomas K Pham
*Assistant Examiner* — Sharrief I Broome
(74) *Attorney, Agent, or Firm* — Cozen O'Connor

(57) ABSTRACT

An imaging lens system includes first and second lens groups each having a positive optical power (P1, P2) and a third lens group. During focusing, the second lens group moves. When the first lens group is divided into two groups across, as a boundary, the longest aerial distance (t1) among the axial lens-to-lens distances located on the image side of the position of half the total length of the first lens group, the object-side group being a front group and the image-side group being a rear group, the most image-side surface in the front group and the most image-side surface in the rear group are lens surfaces concave to the image side. The conditional formulae 0.2<P1/P<0.6, 0.3<P1/P2<0.9, 0.03<t1/t<0.1, and 0.05<t2/t<0.14 are fulfilled (P, the optical power of the entire system; t2, the aerial distance between (Continued)

the first and second lens groups in the infinity-object-distance condition; t, the total length of the system.

13 Claims, 21 Drawing Sheets

(51) Int. Cl.
*G02B 13/18* (2006.01)
*G02B 27/00* (2006.01)

(58) Field of Classification Search
CPC ...... G02B 13/00; G02B 13/003; G02B 13/04; G02B 13/16; G02B 15/173; G02B 19/0014
USPC .................................................. 359/700–715
See application file for complete search history.

FIG.1
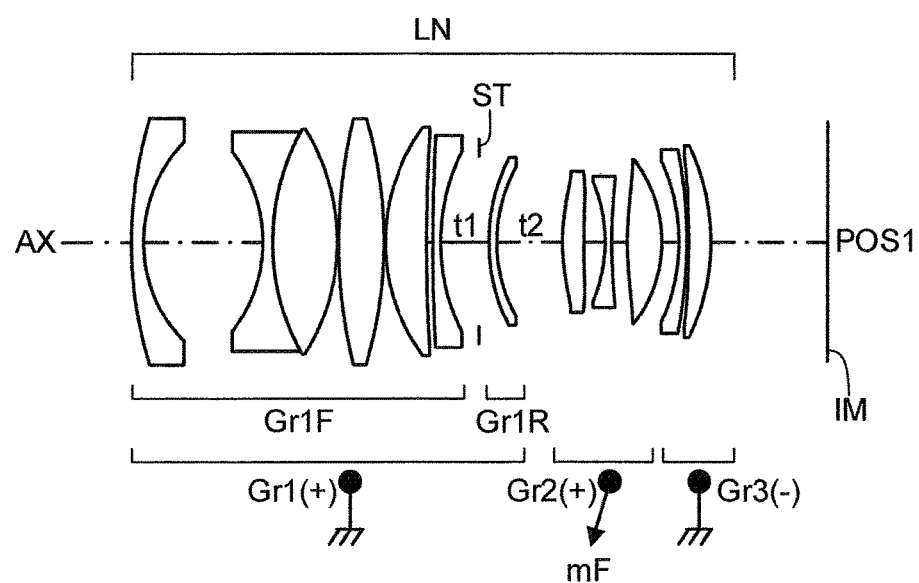
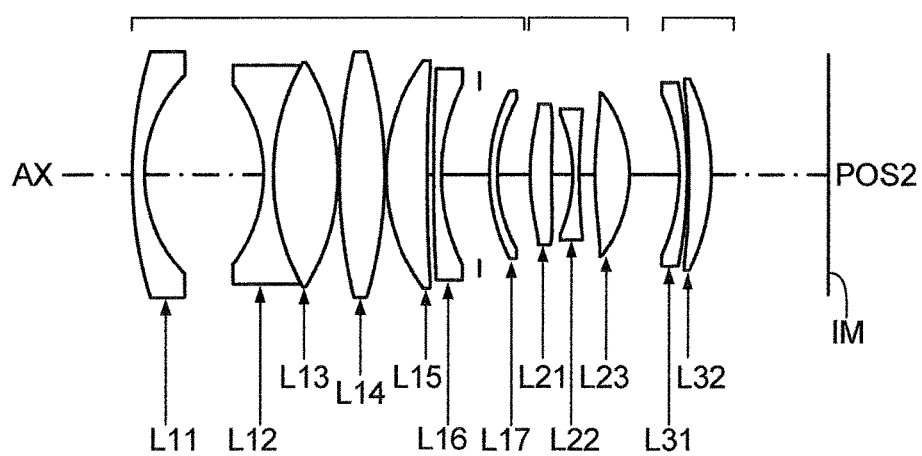

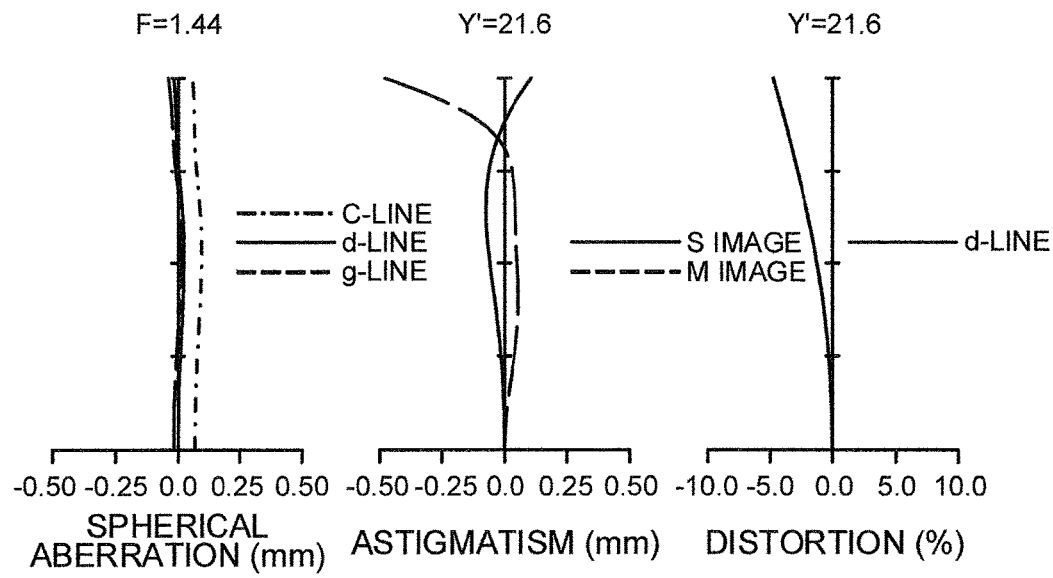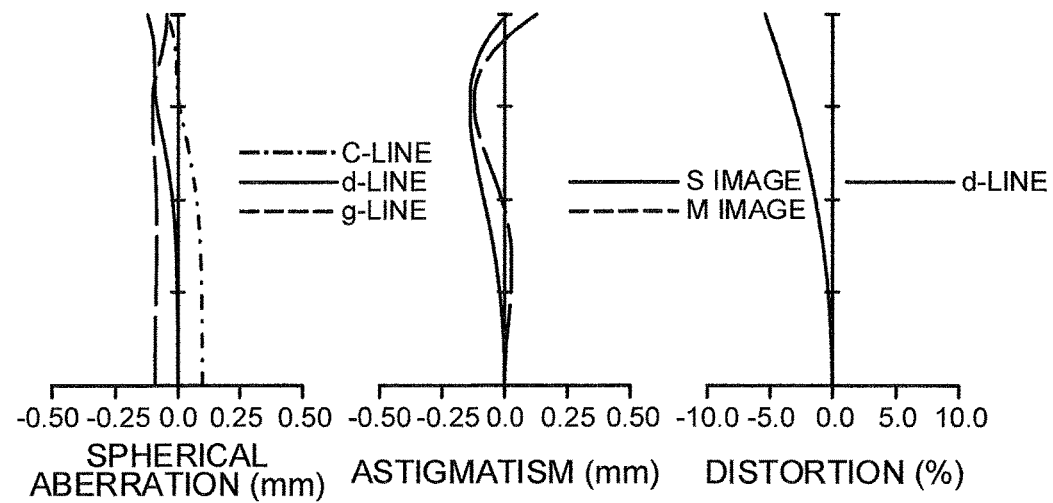

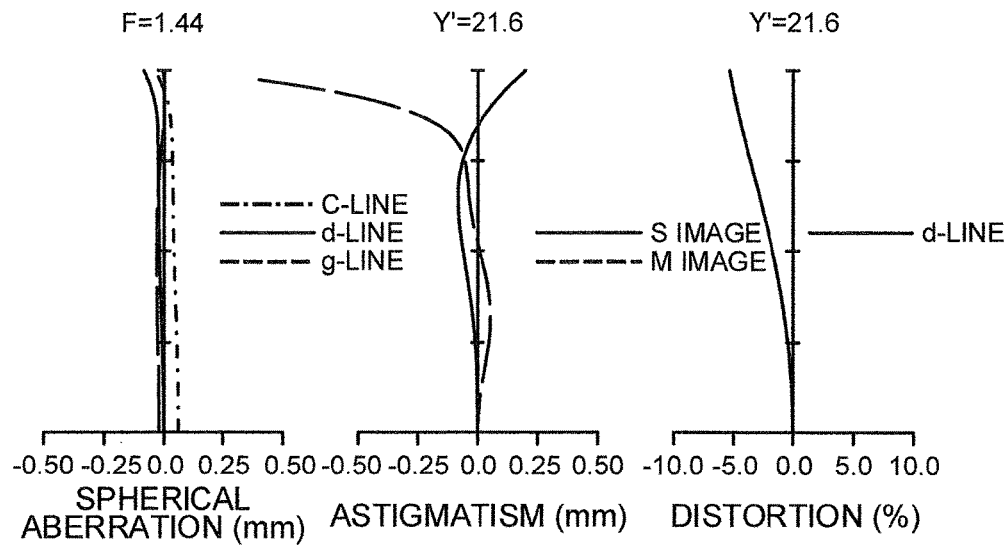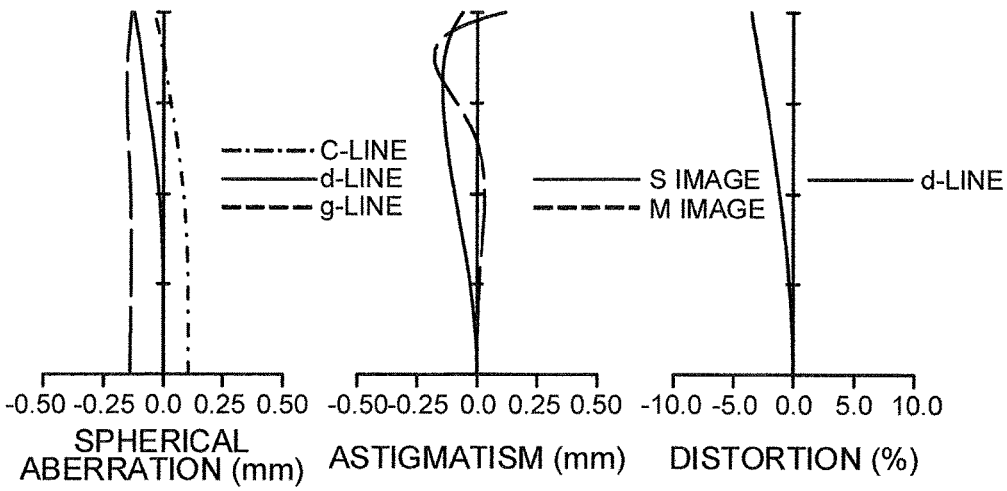

EX3,POS1
F=1.44

EX3,POS1
Y'=21.6

EX3,POS1
Y'=21.6

EX3,POS2
F=1.44

EX3,POS2
Y'=21.6

EX3,POS2
Y'=21.6

EX4,POS1

EX4,POS1

EX4,POS1

EX4,POS2

EX4,POS2

EX4,POS2

EX5,POS1

F=1.44

-0.50 -0.25 0.0 0.25 0.50
SPHERICAL
ABERRATION (mm)

— · — C-LINE
——— d-LINE
– – – g-LINE

EX5,POS1

Y'=21.6

-0.50 -0.25 0.0 0.25 0.50
ASTIGMATISM (mm)

——— S IMAGE
– – – M IMAGE

EX5,POS1

Y'=21.6

-10.0 -5.0 0.0 5.0 10.0
DISTORTION (%)

——— d-LINE

EX5,POS2

F=1.44

-0.50 -0.25 0.0 0.25 0.50
SPHERICAL
ABERRATION (mm)

— · — C-LINE
——— d-LINE
– – – g-LINE

EX5,POS2

Y'=21.6

-0.50 -0.25 0.0 0.25 0.50
ASTIGMATISM (mm)

——— S IMAGE
– – – M IMAGE

EX5,POS2

Y'=21.6

-10.0 -5.0 0.0 5.0 10.0
DISTORTION (%)

——— d-LINE

FIG.11A EX1,POS1     FIG.11D EX1,POS1
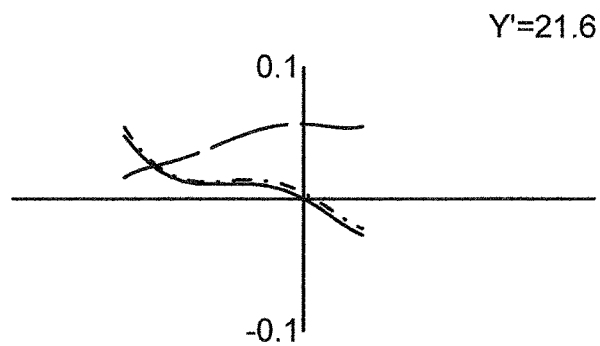 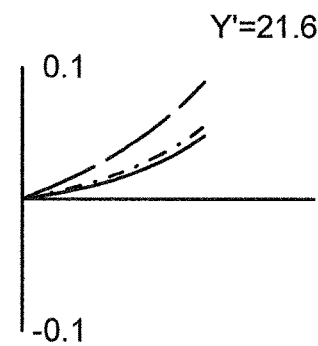
FIG.11B EX1,POS1     FIG.11E EX1,POS1
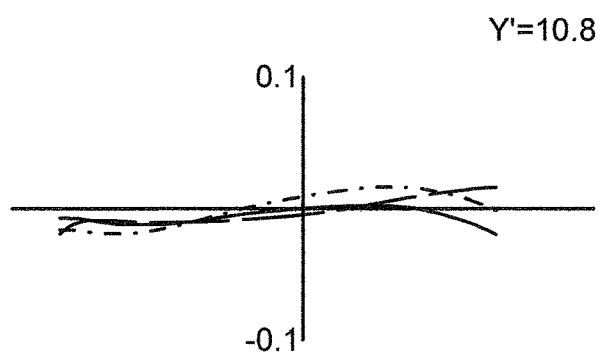 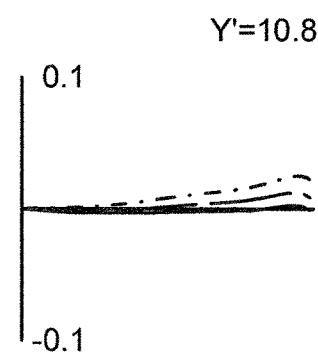
FIG.11C EX1,POS1     FIG.11F EX1,POS1
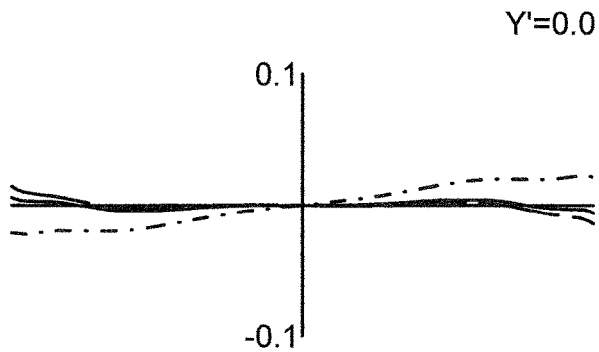 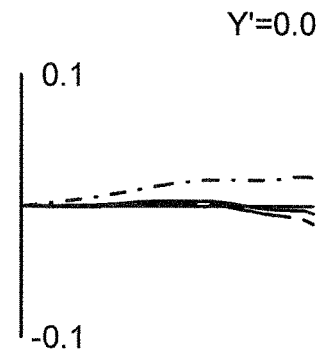
— · — · C-LINE
———— d-LINE
— — — g-LINE FIG.12A EX1,POS2        FIG.12D EX1,POS2
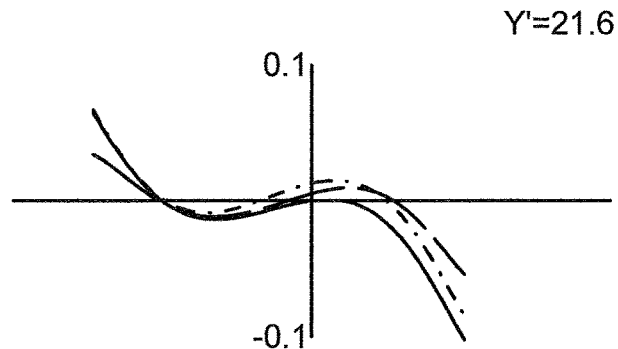
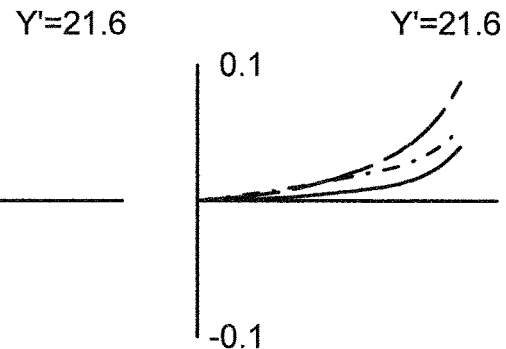
FIG.12B EX1,POS2        FIG.12E EX1,POS2
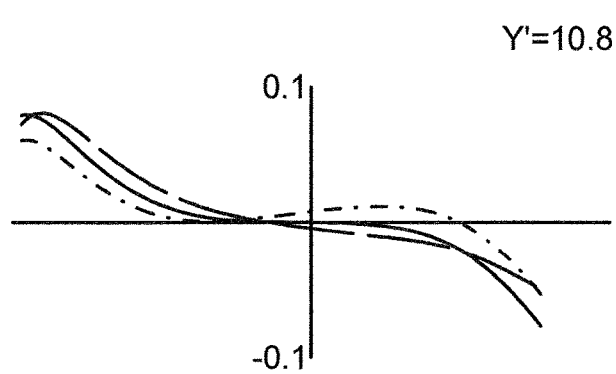
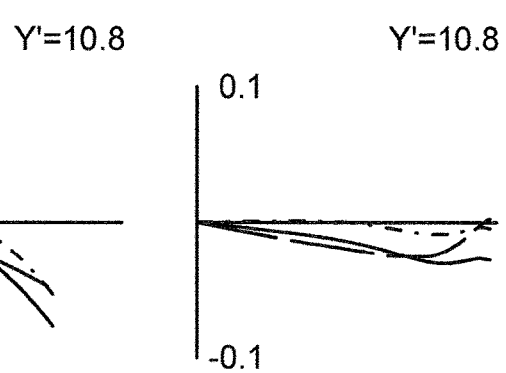
FIG.12C EX1,POS2        FIG.12F EX1,POS2
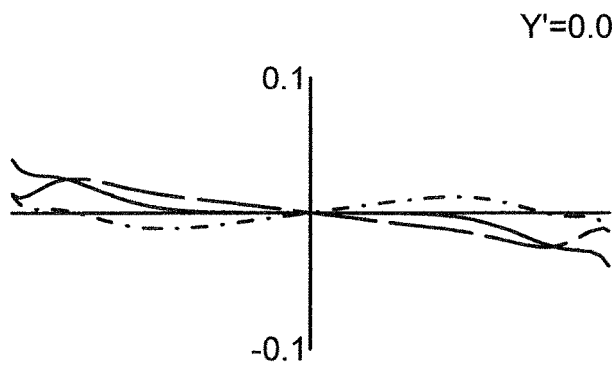
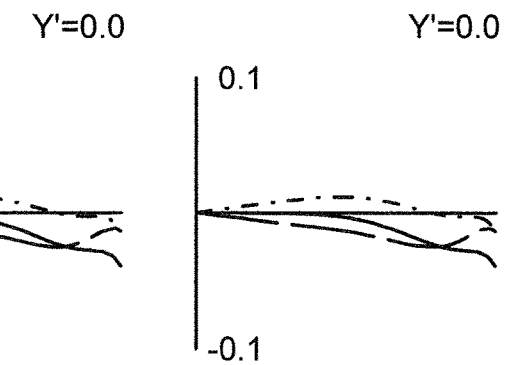
— · — · — C-LINE
———— d-LINE
— — — g-LINE FIG.13A EX2,POS1
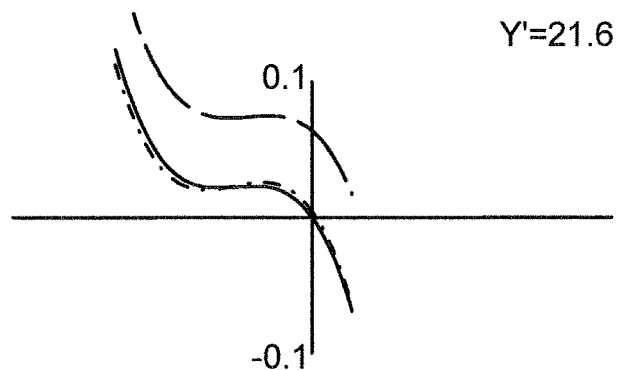
FIG.13D EX2,POS1
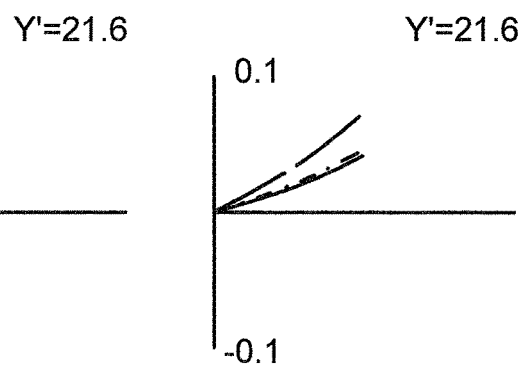
FIG.13B EX2,POS1
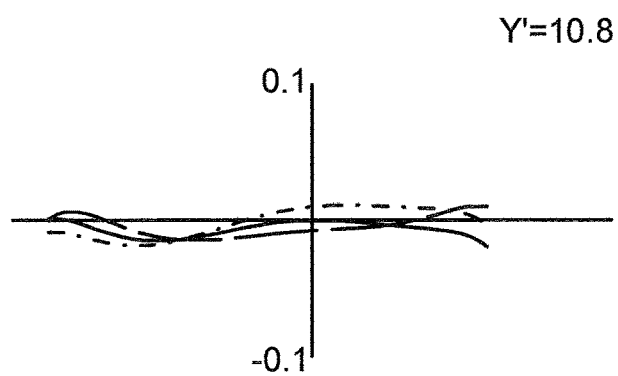
FIG.13E EX2,POS1
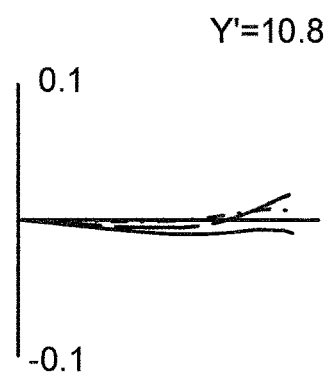
FIG.13C EX2,POS1
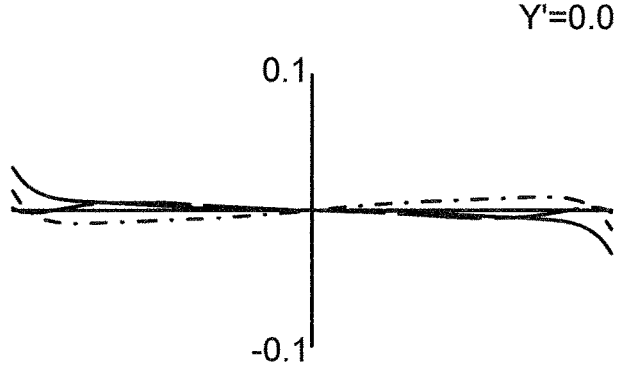
FIG.13F EX2,POS1
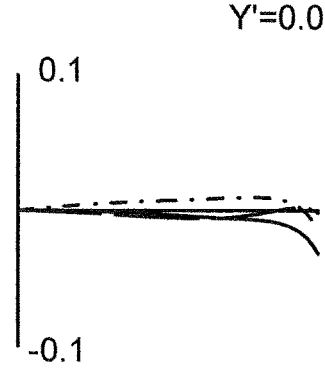
— · — · — C-LINE
———— d-LINE
— — — — g-LINE FIG.14A EX2,POS2    FIG.14D EX2,POS2
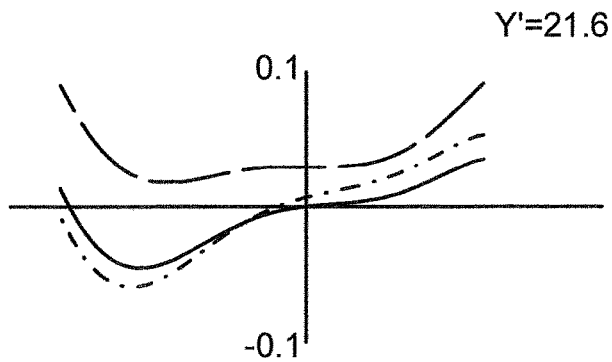 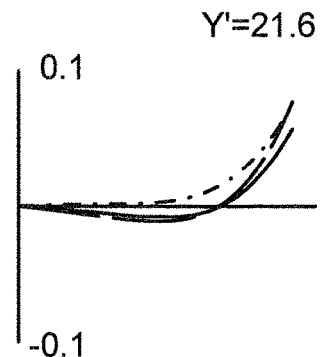
FIG.14B EX2,POS2    FIG.14E EX2,POS2
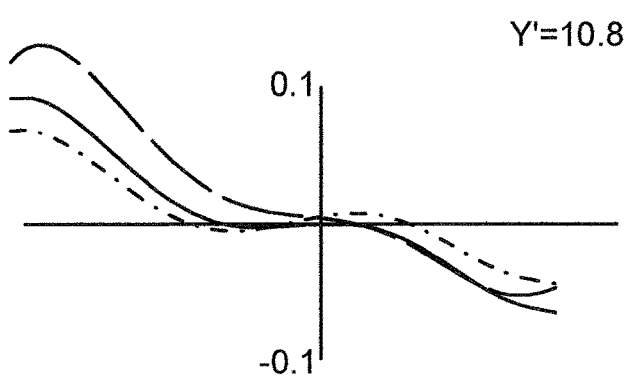 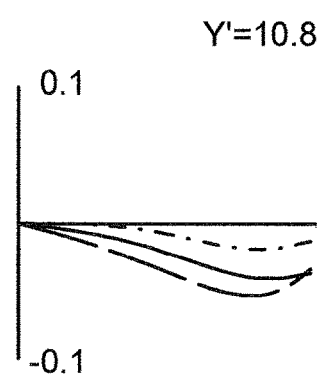
FIG.14C EX2,POS2    FIG.14F EX2,POS2
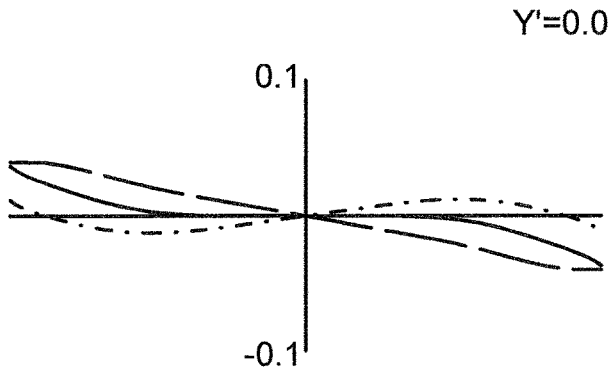 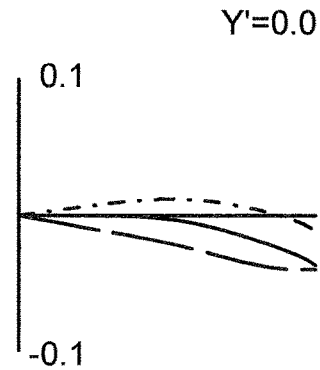
— · — · — C-LINE
——————— d-LINE
— — — g-LINE

FIG.15A EX3,POS1
FIG.15D EX3,POS1
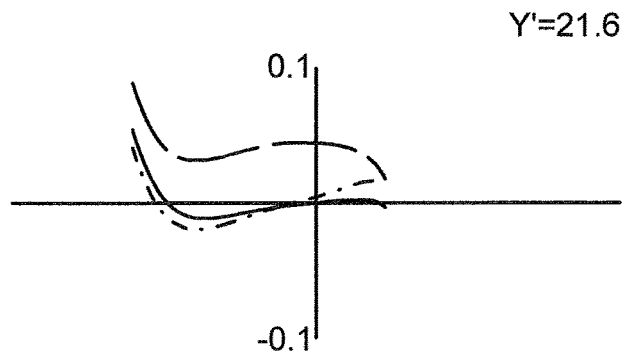
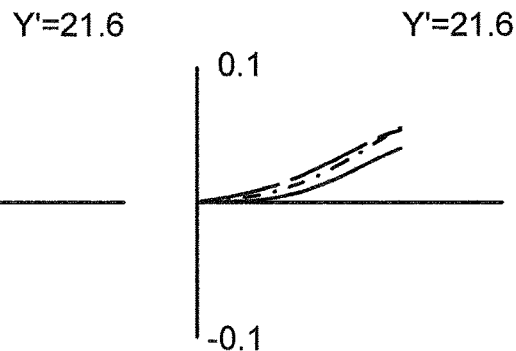
FIG.15B EX3,POS1
FIG.15E EX3,POS1
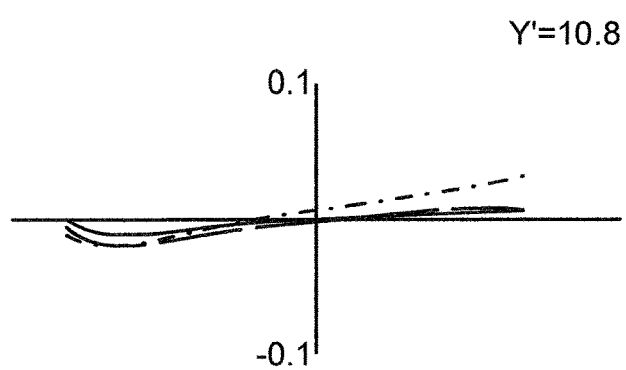
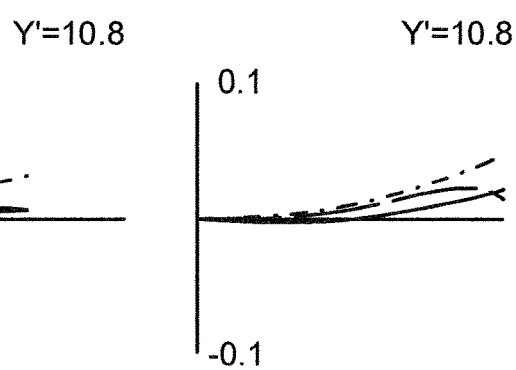
FIG.15C EX3,POS1
FIG.15F EX3,POS1
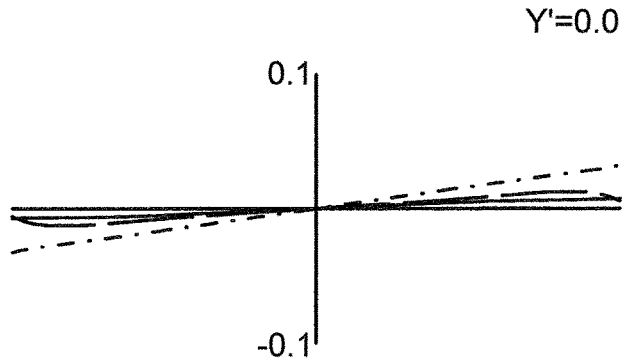
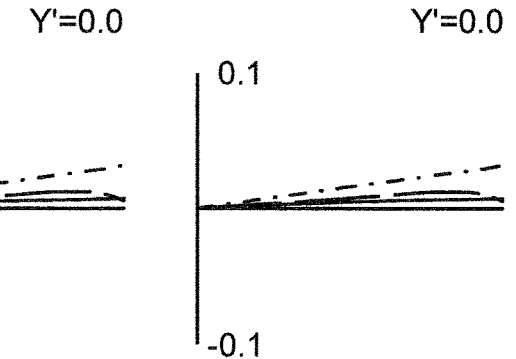
— · — · — C-LINE
———— d-LINE
— — — g-LINE FIG.16A EX3,POS2   FIG.16D EX3,POS2
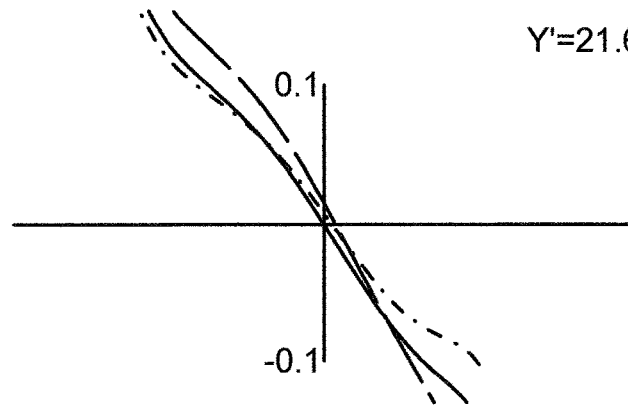
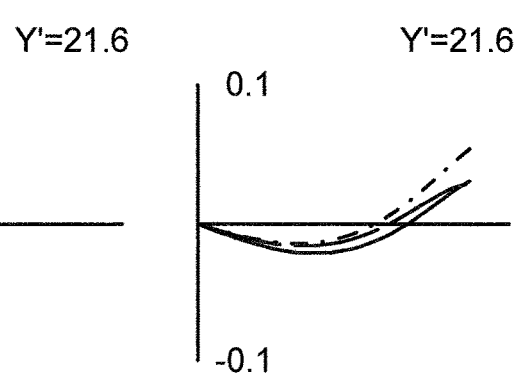
FIG.16B EX3,POS2   FIG.16E EX3,POS2
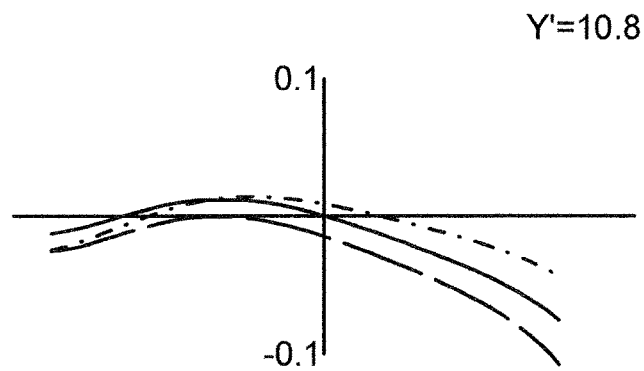
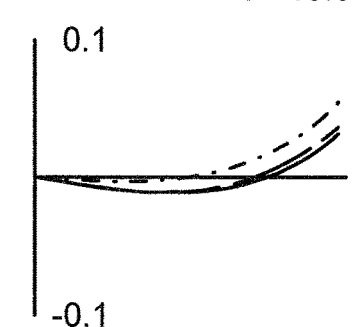
FIG.16C EX3,POS2   FIG.16F EX3,POS2
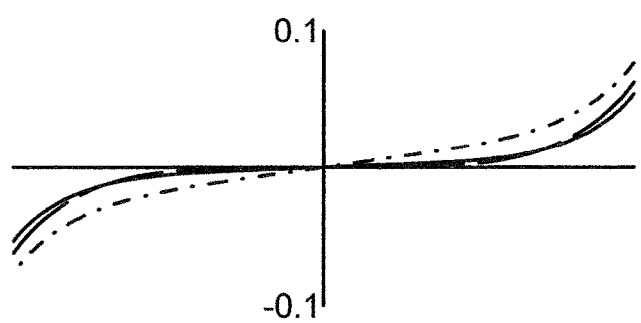
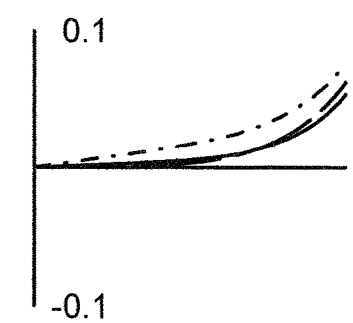
— · — · C-LINE
———— d-LINE
— — — g-LINE FIG.17A EX4,POS1    FIG.17D EX4,POS1
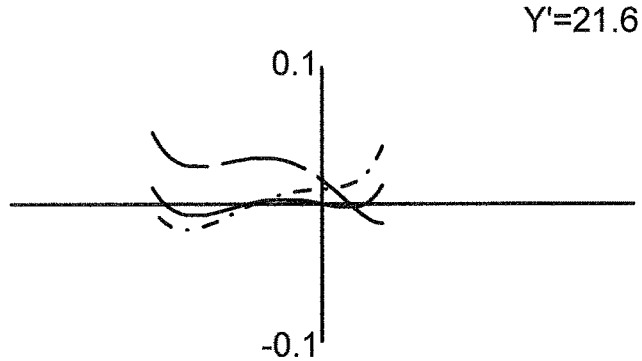
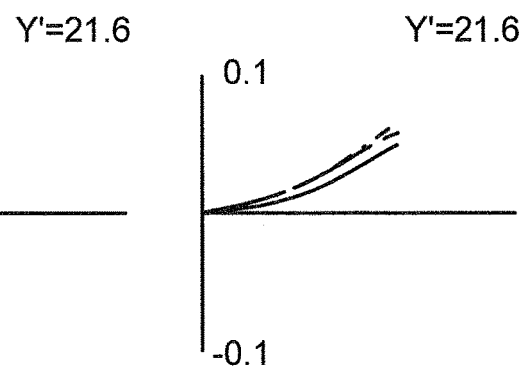
FIG.17B EX4,POS1    FIG.17E EX4,POS1
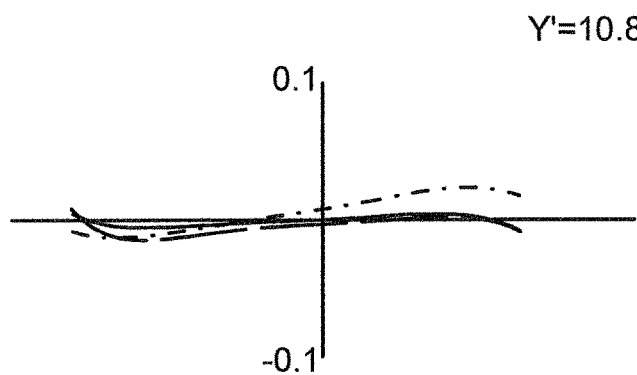
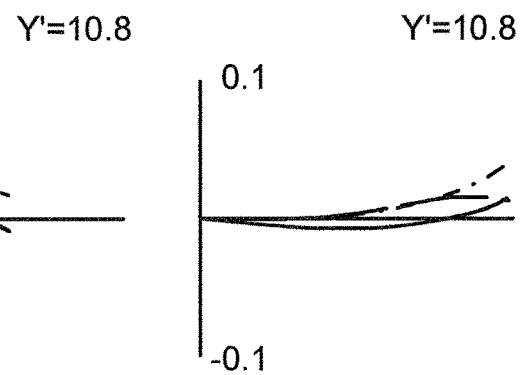
FIG.17C EX4,POS1    FIG.17F EX4,POS1
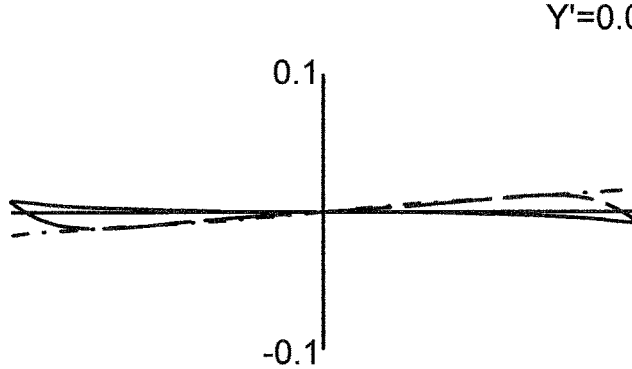
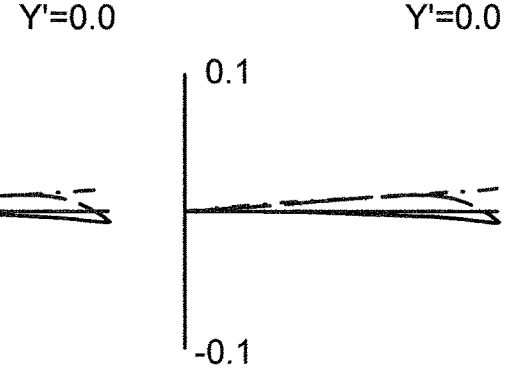
— · — · — C-LINE
———— d-LINE
— — — g-LINE

FIG.18A EX4,POS2
Y'=21.6
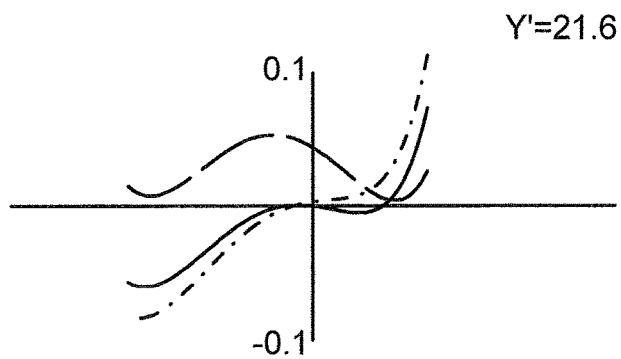
FIG.18D EX4,POS2
Y'=21.6
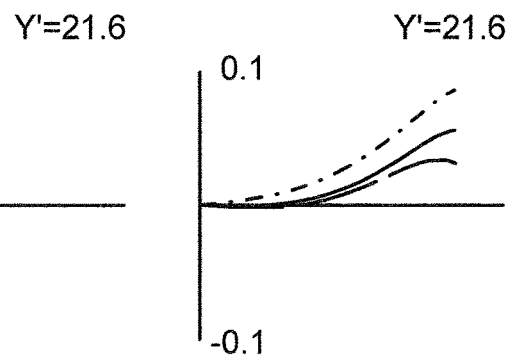
FIG.18B EX4,POS2
Y'=10.8
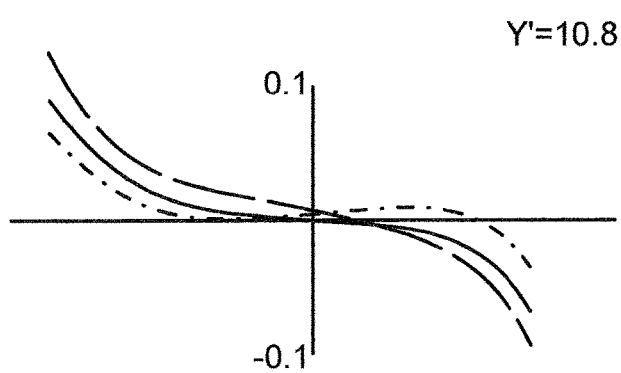
FIG.18E EX4,POS2
Y'=10.8
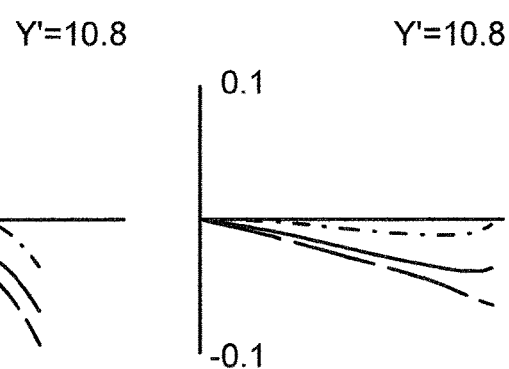
FIG.18C EX4,POS2
Y'=0.0
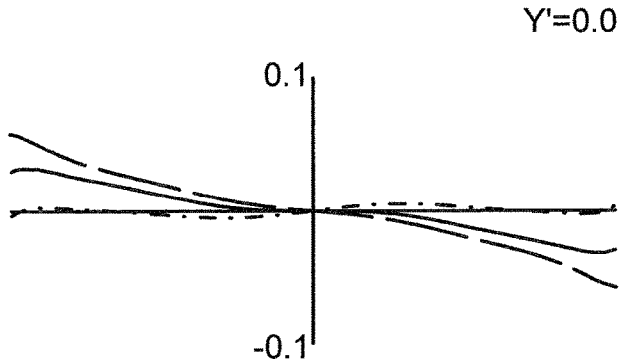
FIG.18F EX4,POS2
Y'=0.0
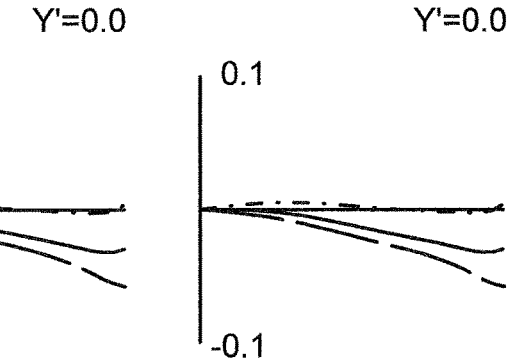
— · — · — C-LINE
————— d-LINE
— — — g-LINE FIG.19A EX5,POS1   FIG.19D EX5,POS1
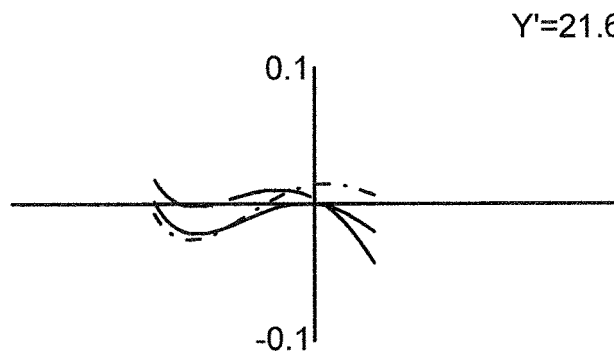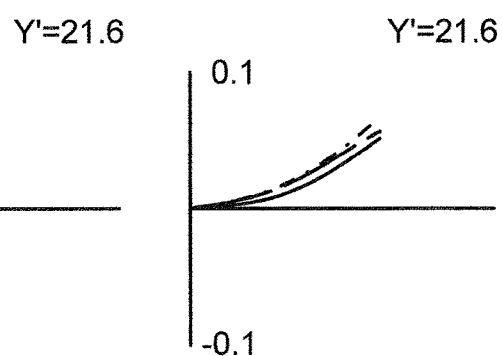
FIG.19B EX5,POS1   FIG.19E EX5,POS1
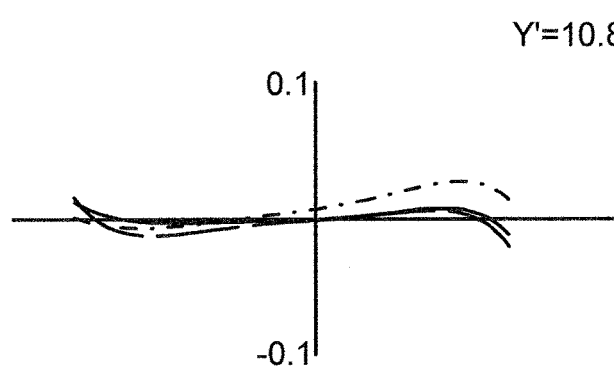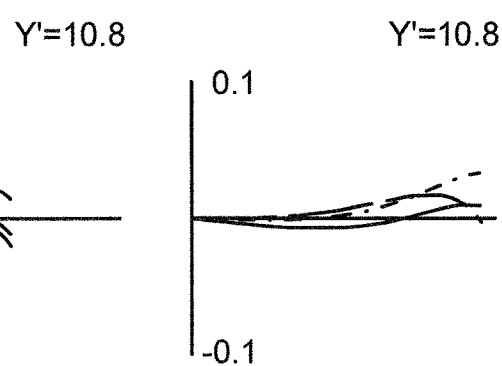
FIG.19C EX5,POS1   FIG.19F EX5,POS1
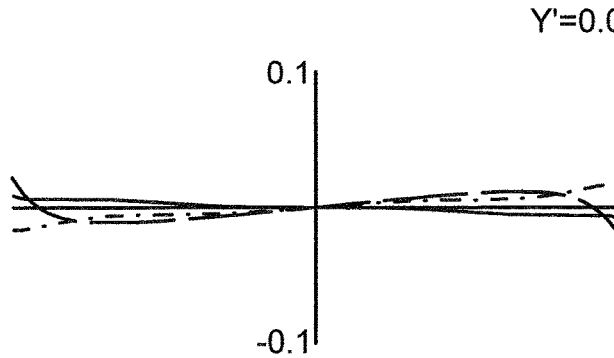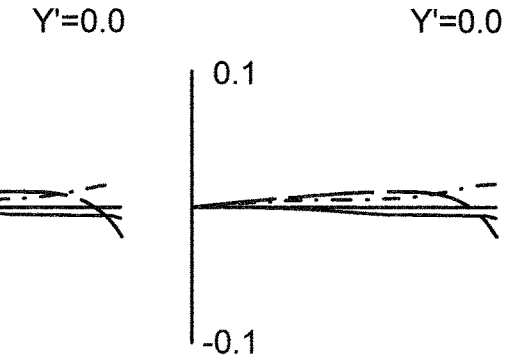
— · — · — C-LINE
———— d-LINE
— — — — g-LINE FIG.20A EX5,POS2
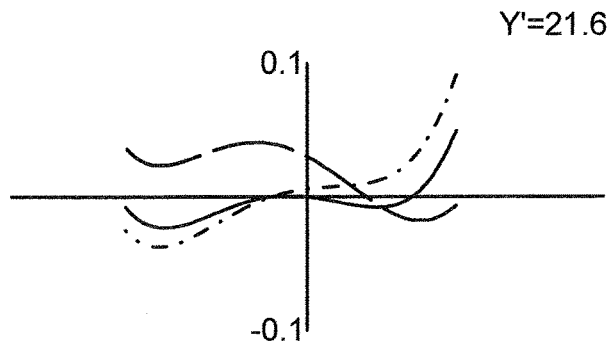
FIG.20D EX5,POS2
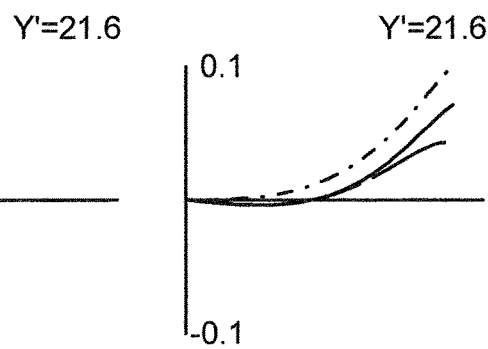
FIG.20B EX5,POS2
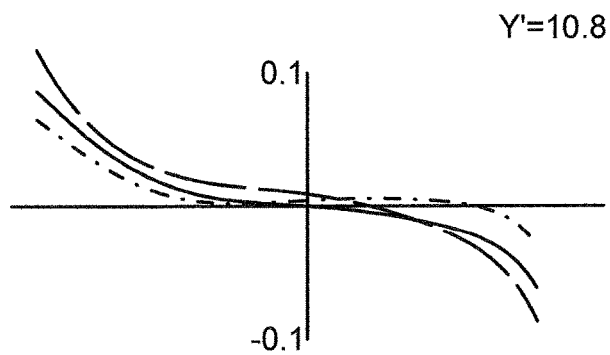
FIG.20E EX5,POS2
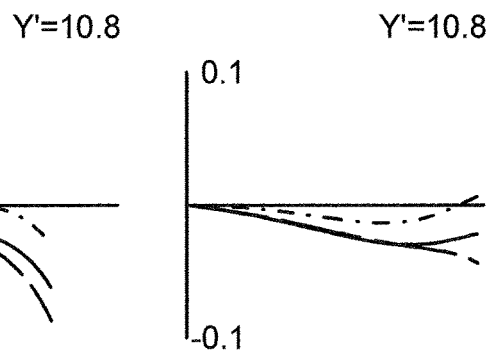
FIG.20C EX5,POS2
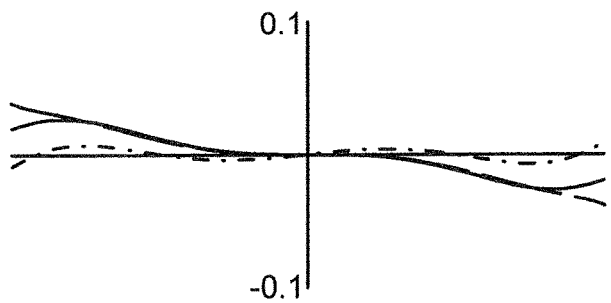
FIG.20F EX5,POS2
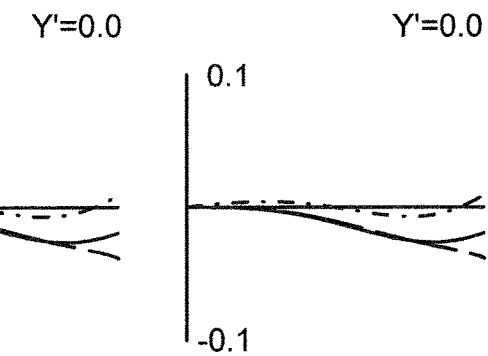
— · — · — C-LINE
———— d-LINE
— — — g-LINE

IMAGING LENS SYSTEM, IMAGING OPTICAL DEVICE, AND DIGITAL APPLIANCE

This application is based on Japanese Patent Application No. 2015-245003 filed on Dec. 16, 2015, the contents of which are hereby incorporated by reference.

BACKGROUND OF THE INVENTION

1. Field of the Invention

The present invention relates to an imaging lens system, an imaging optical device, and a digital appliance. More particularly, the present invention relates to, for example, a compact, large-diameter imaging lens system suitable for an interchangeable-lens digital camera that takes in an image of a subject with an image sensor (e.g., a solid-state image sensor such as a CCD (charge-coupled device) image sensor or a CMOS (complementary metal-oxide semiconductor) image sensor), an imaging optical device that outputs the image of the subject thus taken in with the imaging lens system and the image sensor in the form of an electrical signal, and a digital appliance equipped with an image input function, such as a digital camera, that incorporates the imaging optical device.

2. Description of Related Art

Conventionally, imaging lens systems with fast f-numbers (i.e., with smaller f-numbers) have been sought. On the other hand, in recent years, digital single-lens-reflex cameras have been adapted to increasingly high resolutions, and in addition it has been becoming increasingly easy for users to check images on a true-to-pixel-size basis. Accordingly, increasingly high optical performance is required in imaging lens systems, and high uniformity of image quality across the entire image is sought eagerly even at the shortest shooting distance. Moreover, in mirrorless interchangeable-lens digital cameras, which have no swing-up mirror any more, the focusing group is required to be lightweight to permit faster focusing by contrast AF (autofocus). To meet these needs, imaging lens systems of a type that is suitable to reduce the weight of the focusing group while maintaining high optical performance are proposed in Patent Documents 1 and 2 identified below.

Patent Document 1: Japanese Patent Application published as No. 2014-48488

Patent Document 2: Japanese Patent Application published as No. 2014-238608

However, in the imaging lens system disclosed in Patent Document 1, the optical power of the first lens group is so low relative to the optical power of the entire system that no sufficient optical power is gained in the first lens group; thus, a large part of the optical power of the entire system has to be accounted for by the third lens group. As a result, spherical aberration cannot be corrected satisfactorily, and this makes it impossible to achieve a diameter large enough to provide an f-number of about 1.4 combined with satisfactory aberration correction.

On the other hand, in the imaging lens system disclosed in Patent Document 2, fewer lens elements are used in the focusing group to reduce its weight and thereby achieve faster focusing. However, the optical power of the first lens group is so low relative to the optical power of the second lens group, which is the focusing group, that most of the overall optical power is accounted for by the second lens group. Generally, as the optical power of the focusing group increases, the variation of aberrations that accompanies variation of the shooting distance increases, and this makes it difficult to correct aberrations satisfactorily from the infinity-shooting condition to the close-distance-shooting condition.

SUMMARY OF THE INVENTION

Devised against the background discussed above, the present invention aims to provide an imaging lens system that, despite having a fast f-number, provides extremely high optical performance combined with extremely fast focusing performance irrespective of the shooting distance, and to provide an imaging optical device and a digital appliance that are provided with such an imaging lens system.

According to one aspect of the present invention, an imaging lens system includes, from the object side, a first lens group having a positive optical power, a second lens group having a positive optical power, and a third lens group. During focusing, while the first and third lens groups remain stationary relative to the image surface, the second lens group moves. When the first lens group is divided into two lens groups across, as a boundary, the longest aerial distance among the axial lens-to-lens distances located on the image side of the position of half the total length of the first lens group within the first lens group, with the object-side lens group called a front group and the image-side lens group called a rear group, then the surface at the most image-side position in the front group is a lens surface concave to the image side, and the surface at a most image-side position in the rear group is a lens surface concave to the image side. Moreover, conditional formulae (1) to (4) below are fulfilled:

$$0.2 < P1/P < 0.6 \quad (1)$$

$$0.3 < P1/P2 < 0.9 \quad (2)$$

$$0.03 < t1/t < 0.1 \quad (3)$$

$$0.05 < t2/t < 0.14 \quad (4)$$

where

P1 represents the optical power of the first lens group;
P2 represents the optical power of the second lens group;
P represents the optical power of the entire system;
t1 represents the longest aerial distance among the axial lens-to-lens distances located on the image side of the position of half the total length of the first lens group within the first lens group;
t2 represents the aerial distance between the first and second lens groups in the infinity-object-distance condition; and
t represents the total length of the imaging lens system.

According to another aspect of the present invention, an imaging optical device includes an imaging lens system as described above and an image sensor for converting an optical image formed on an imaging surface into an electrical signal. The imaging lens system is arranged such that an optical image of a subject is formed on the imaging surface of the image sensor.

According to yet another aspect of the present invention, a digital appliance includes an imaging optical device as described above so as to be additionally provided with at least one of a function of shooting a still image of the subject or a function of shooting a moving image of the subject.

BRIEF DESCRIPTION OF THE DRAWINGS

FIG. 1 is a lens arrangement diagram of a first embodiment (Example 1) of the present invention;

FIGS. 6A to 6F are longitudinal aberration diagrams of Example 1;

FIGS. 7A to 7F are longitudinal aberration diagrams of Example 2;

FIGS. 11A to 11F are lateral aberration diagrams of Example 1 at the first focus position;

FIGS. 12A to 12F are lateral aberration diagrams of Example 1 at the second focus position;

FIGS. 13A to 13F are lateral aberration diagrams of Example 2 at the first focus position;

FIGS. 14A to 14F are lateral aberration diagrams of Example 2 at the second focus position;

FIGS. 15A to 15F are lateral aberration diagrams of Example 3 at the first focus position;

FIGS. 16A to 16F are lateral aberration diagrams of Example 3 at the second focus position;

FIGS. 17A to 17F are lateral aberration diagrams of Example 4 at the first focus position;

FIGS. 18A to 18F are lateral aberration diagrams of Example 4 at the second focus position;

FIGS. 19A to 19F are lateral aberration diagrams of Example 5 at the first focus position;

FIGS. 20A to 20F are lateral aberration diagrams of Example 5 at the second focus position.

DETAILED DESCRIPTION OF PREFERRED EMBODIMENTS

Figure 2:
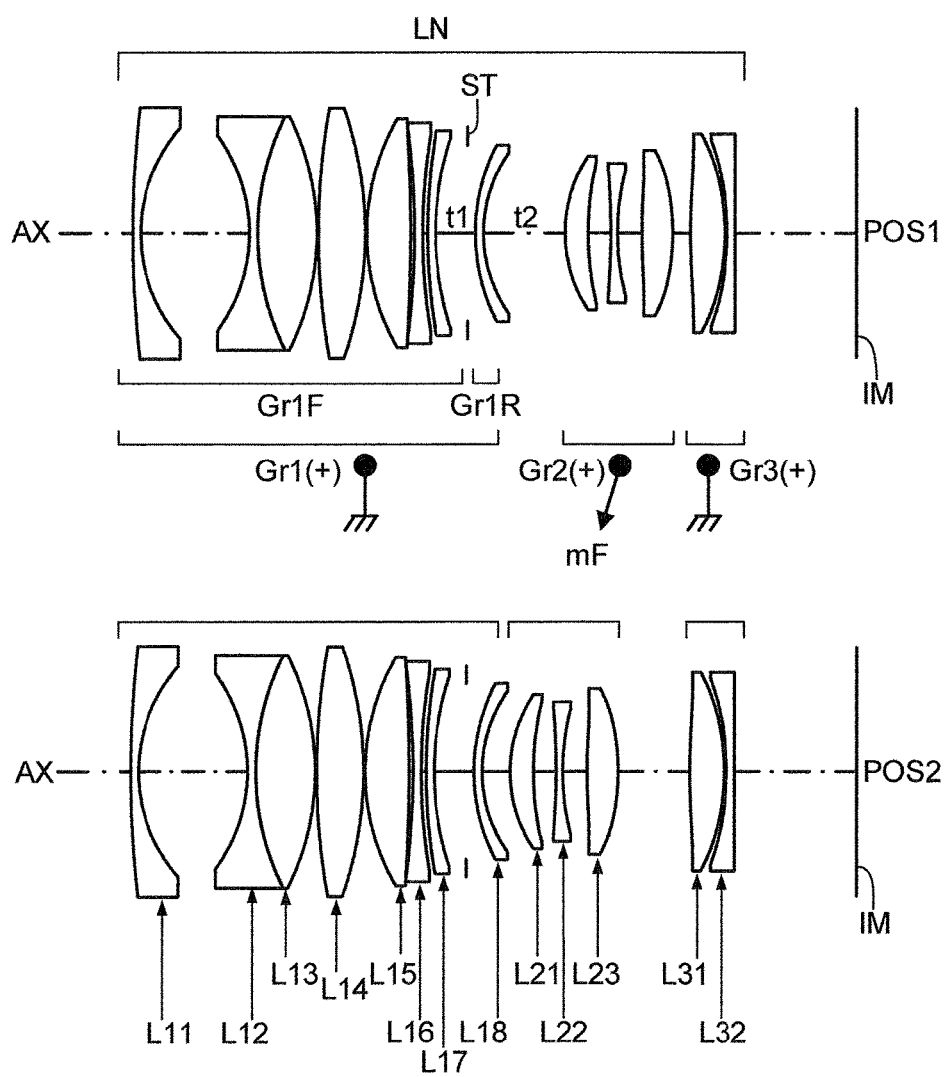
FIG. 2 is a lens arrangement diagram of a second embodiment (Example 2) of the present invention.
Figure 3:
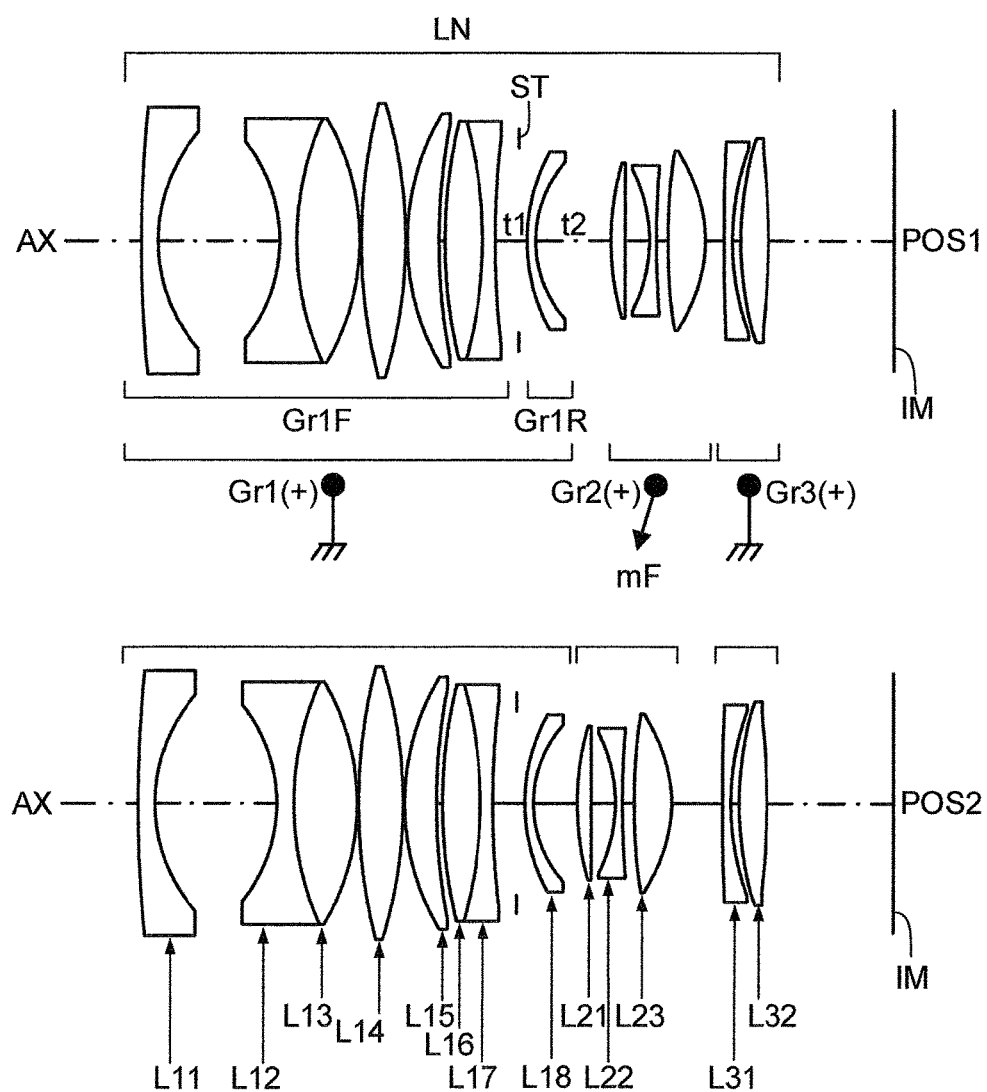
FIG. 3 is a lens arrangement diagram of a third embodiment (Example 3) of the present invention.
Figure 4:
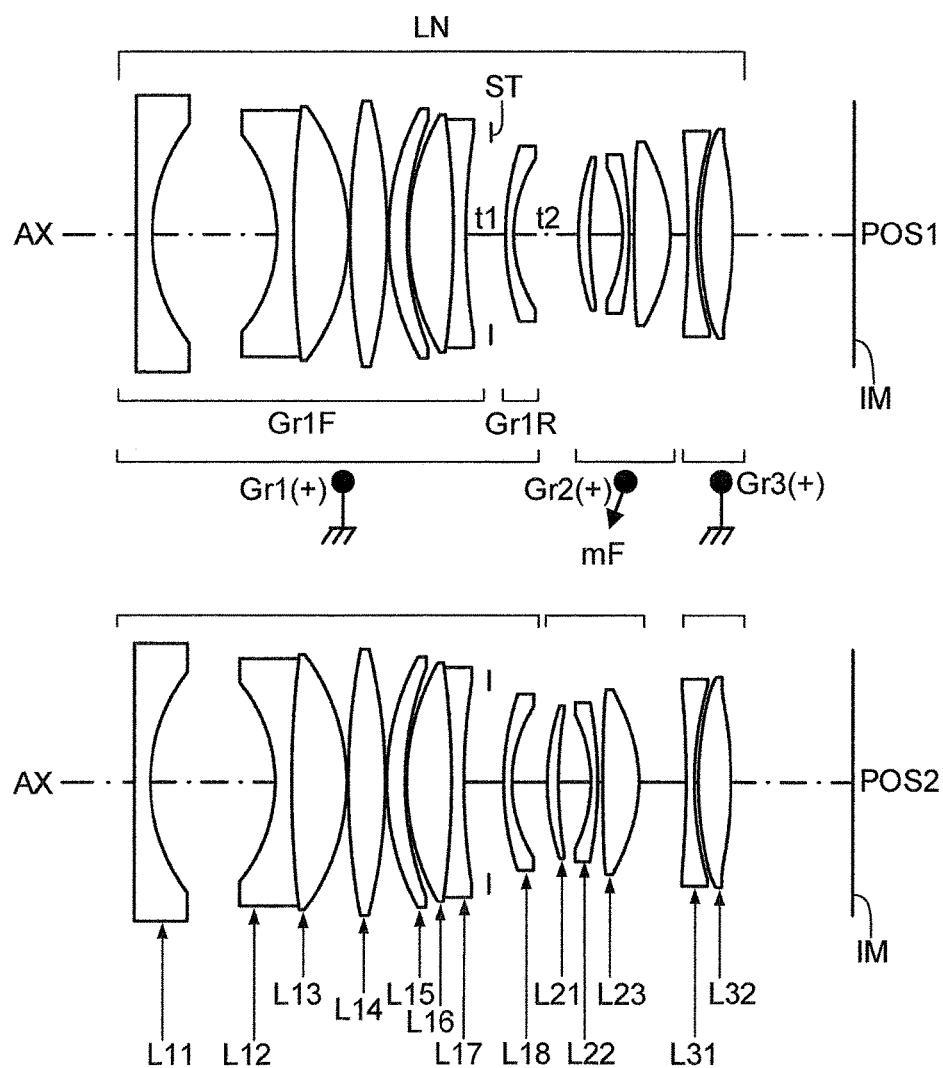
FIG. 4 is a lens arrangement diagram of a fourth embodiment (Example 4) of the present invention.
Figure 5:
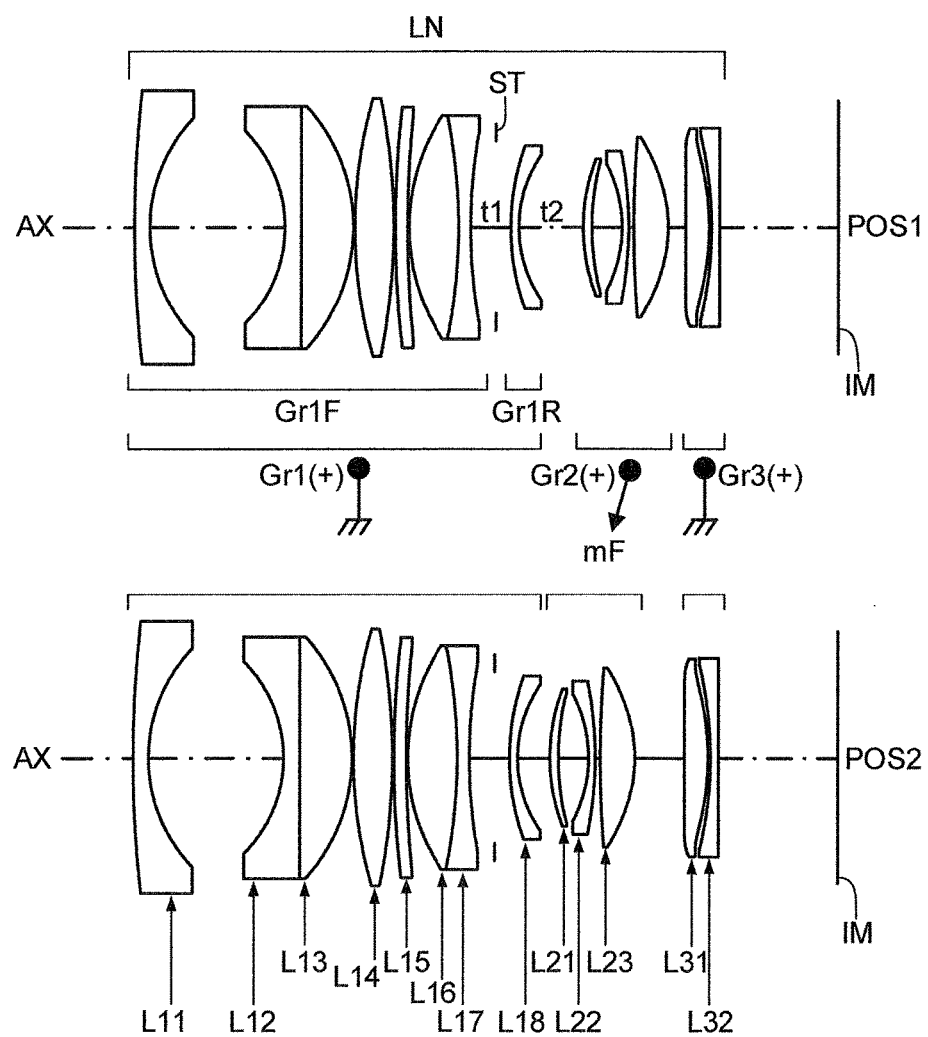
FIG. 5 is a lens arrangement diagram of a fifth embodiment (Example 5) of the present invention.
Figure 8A:
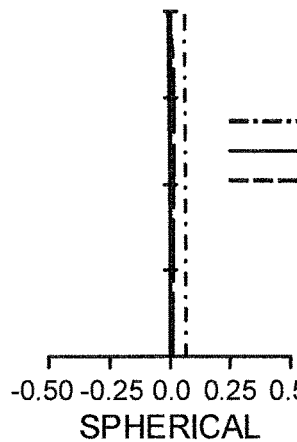
FIGS. 8A to 8F are longitudinal aberration diagrams of Example 3.
Figure 8B:
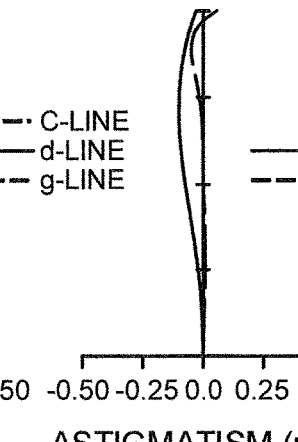
Figure 8C:
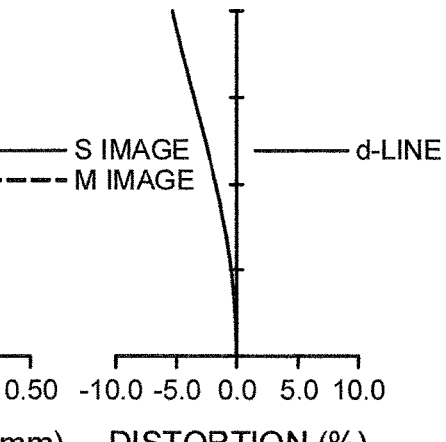
Figure 8D:
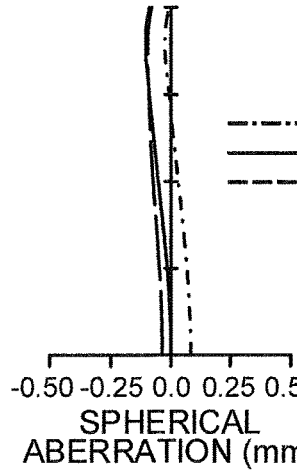
Figure 8E:
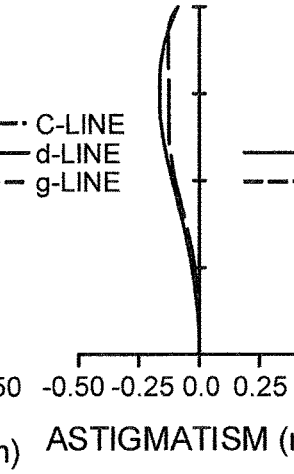
Figure 8F:
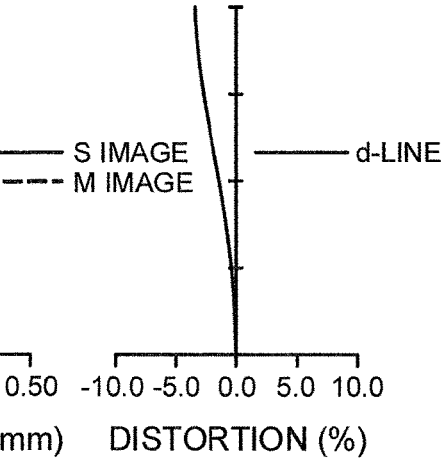
Figure 9A:
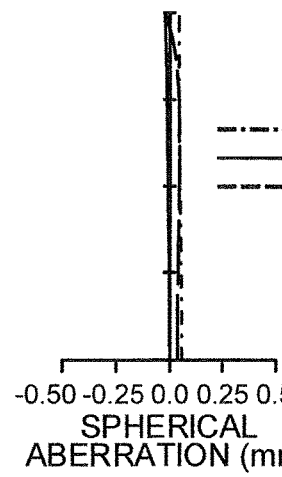
FIGS. 9A to 9F are longitudinal aberration diagrams of Example 4.
Figure 9B:
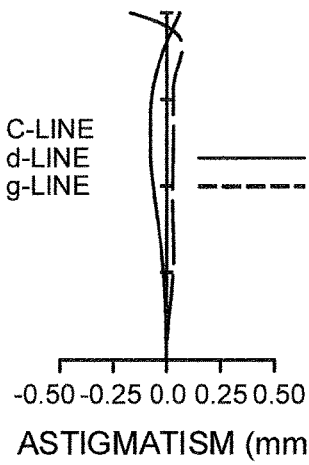
Figure 9C:
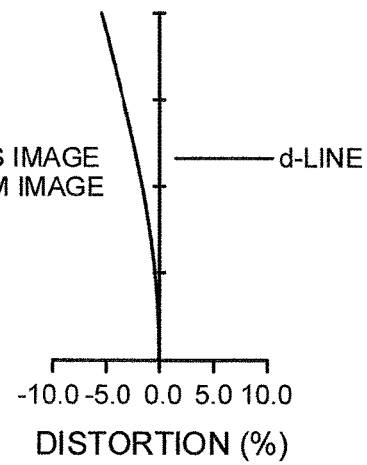
Figure 9D:
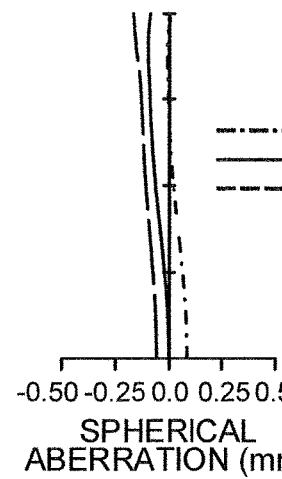
Figure 9E:
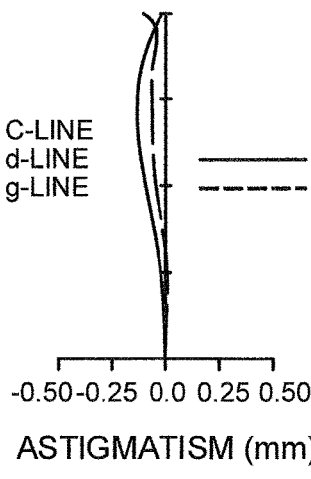
Figure 9F:
Figure 10A:
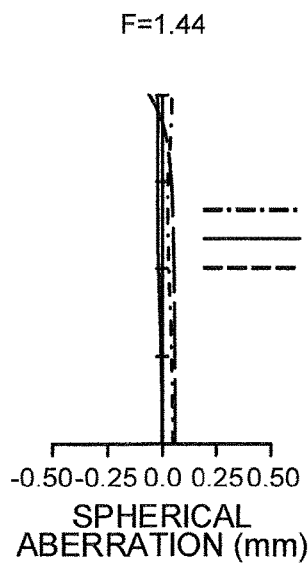
FIGS. 10A to 10F are longitudinal aberration diagrams of Example 5.
Figure 10B:
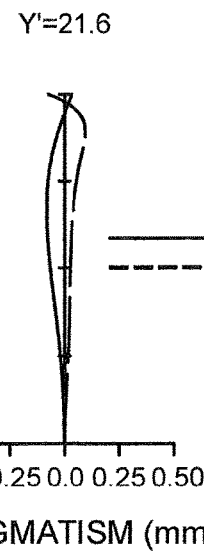
Figure 10C:
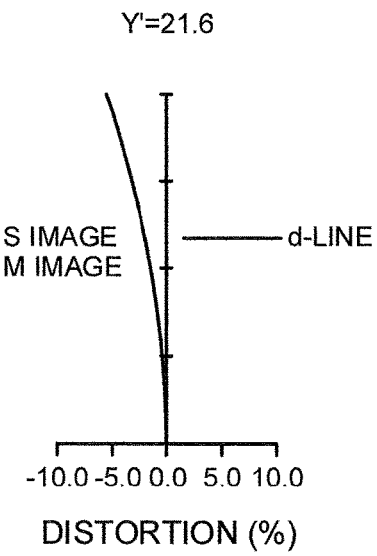
Figure 10D:
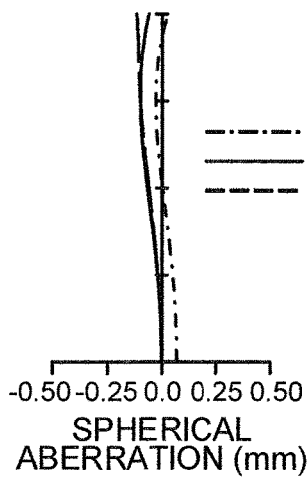
Figure 10E:
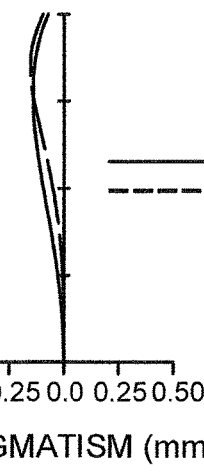
Figure 10F:
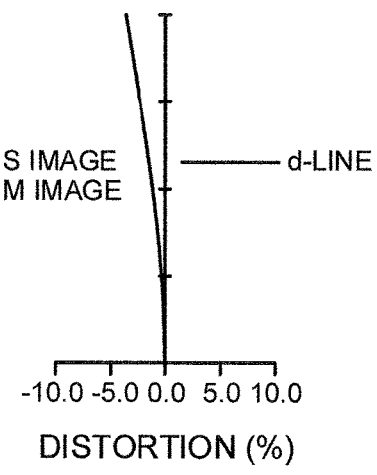

Hereinafter, imaging lens systems, imaging optical devices, and digital appliances embodying the present invention will be described. An imaging lens system embodying the present invention includes, from the object side, a first lens group having a positive optical power, a second lens group having a positive optical power, and a third lens group (here, an optical power is a quantity defined as the reciprocal of a focal length), and is configured such that, for focusing, while the first and third lens groups remain stationary relative to the image surface, the second lens group moves. Moreover, when the first lens group is divided into two lens groups across, as a boundary, the longest aerial distance among the axial lens-to-lens distances located on the image side of the position of half the total length of the first lens group within the first lens group, with the object-side lens group called the front group and the image-side lens group called the rear group, then the most image-side surface in the front group is a lens surface concave to the image side, the most image-side surface in the rear group is a lens surface concave to the image side, and conditional formulae (1) to (4) below are fulfilled.

$$0.2 < P1/P < 0.6 \quad (1)$$

$$0.3 < P1/P2 < 0.9 \quad (2)$$

$$0.03 < t1/t < 0.1 \quad (3)$$

$$0.05 < t2/t < 0.14 \quad (4)$$

where

P1 represents the optical power of the first lens group;
P2 represents the optical power of the second lens group;
P represents the optical power of the entire system;
t1 represents the longest aerial distance among the axial lens-to-lens distances located on the image side of the position of half the total length of the first lens group within the first lens group;
t2 represents the aerial distance between the first and second lens groups in an infinity-object-distance condition; and
t represents the total length of the imaging lens system.

By adopting a design where, for focusing from an object at infinity to an object at a close distances, while the first and third lens groups are kept stationary, the second lens group alone is moved, it is possible to reduce the weight of the focusing group and increase the focusing speed (faster focusing). That is, reducing the weight of the focusing group makes it possible to increase the speed of automatic focusing and reduce the time required for focusing movement. This brings about benefits such as an excellent feel of use and a reduced load on the motor.

Because of the rear group, which has a concave surface at the most image-side position, being arranged at a position located between large aerial distances on the object side of the second lens group, which is the focusing group, even when the position of the second lens group varies during focusing, it is possible to suppress variation of the incidence paths of rays, and thereby to suppress variation of curvature of field. As a result, less curvature of field occurs from the infinity-object distance to the shortest-object distance, and more uniform image quality is obtained across the entire image (high performance during focusing).

Moreover, to reduce the diameter of the second lens group, which is the focusing group, as high an optical power as possible needs to be gained in the first lens group, and thus, the optical power of the first lens group relative to the optical power of the entire system needs to fall within the range of conditional formula (1) above. From this perspective, conditional formula (1) defines a preferred conditional range as to the optical power of the first lens group.

Above the lower limit of conditional formula (1), it is possible to reduce the height of the rays entering the second lens group, and thereby to prevent the focusing group from having a large diameter. Also, the first lens group is prevented from having an excessively low optical power, and the second lens group does not need to be given an excessively high optical power in relative terms to keep the total length constant; it is thus possible to suppress the chromatic coma occurring in the second lens group, and also to prevent aggravation of astigmatism. On the other hand, below the upper limit of conditional formula (1), the first lens group is prevented from having an excessively high optical power, and it is possible to reduce occurrence of various aberrations including spherical aberration. Simultaneously, it is possible to reduce the angle of rays entering the second lens group, and thereby to prevent an increase in pupil magnification in close shooting and the resulting increase in aberrations. Accordingly, by fulfilling conditional formula (1), it is possible to achieve, in a compact, large-diameter imaging lens system, a good balance between high performance during focusing and high focusing speed resulting from the reduced weight of the focusing group.

In an inner-focus design (inner-focus type) where, in a three-group construction having a positive-positive power arrangement toward the object side, the second lens group serves as the focusing group, the ratio of the optical power of the first lens group to that of the second lens group matters in reducing the focal length of the entire system and simultaneously achieving satisfactory aberration correction, and needs to fall within the range of conditional formula (2). From this perspective, conditional formula (2) defines a preferred conditional range as to the optical powers of the first and second lens groups.

Above the lower limit of conditional formula (2), the second lens group is prevented from having an excessively high optical power compared with the first lens group, and this makes it possible to reduce the chromatic coma occurring in the second lens group. Generally, as the optical power of the focusing group increases, the variation of aberrations resulting from variation of the shooting distance increases; thus, suppressing the optical power of the second lens group makes it possible to achieve satisfactory aberration correction from the infinity shooting condition to the close-distance (shortest-object-distance) shooting condition. On the other hand, below the upper limit of conditional formula (2), the second lens group is prevented from having an excessively low optical power compared with the first lens group, and this makes it possible to avoid an excessively long movement stroke for the focusing group, and thus to achieve high-speed focusing. Accordingly, by fulfilling conditional formula (2), it is possible to achieve, in a compact, large-diameter imaging lens system, a good balance between high performance during focusing and high focusing speed resulting from the reduced movement stroke for focusing.

The first lens group is composed of a front group and a rear group, the front and rear groups being arranged on the object side and on the image side, respectively, across the longest aerial distance among the axial lens-to-lens distances located on the image side of the position of half the total length of the first lens group within the first lens group. At the most image-side position in the front group, a lens element having a concave surface on the image side is arranged, and at the most image-side position in the rear group, a lens element having a concave surface on the image side is arranged. That is, in both the front and rear groups, the most image-side surface is a lens surface concave to the image side. The distance between the front and rear groups matters in reducing the total length of the imaging lens system and in suppressing variation of performance during focusing, and from this perspective, conditional formula (3) defines a preferred conditional range as to the aerial distance t1 between the front and rear groups. Moreover, the distance between the first and second lens groups matters in reducing the total length of the imaging lens system and in stabilizing its optical performance, and from this perspective, conditional formula (4) defines a preferred conditional range as to the aerial distance t2 between the first and second lens groups.

Above the lower limit of conditional formula (3), an adequate aerial distance t1 is obtained; this permits those rays which are bent upward by the lens element arranged at the most image-side position in the front group to be bent downward by the lens element arranged at the most image-side position in the rear group, and helps make rays, from upper to lower, closer to parallel to the optical axis, making it possible to reduce variation of performance accompanying the movement of the focusing group, variation of curvature of field in particular. On the other hand, below the upper limit of conditional formula (3), it is possible to prevent the imaging lens system having a large total length. Accordingly, by fulfilling conditional formula (3), it is possible to reduce the total length of the imaging lens system and simultaneously prevent deterioration of variation of performance during focusing.

Above the lower limit of conditional formula (4), it is possible to make the principal points of the first and second lens groups farther from each other, and thereby to obtain an imaging lens system with smaller deterioration of performance even with decentering occurring in the second lens group, which is the focusing group, during focusing. Moreover, with a sufficient distance kept during focusing, it is possible to prevent contact between lens groups, and thereby to enhance reliability. On the other hand, below the upper limit of conditional formula (4), it is possible to prevent the imaging lens system from having a large total length. Accordingly, by fulfilling conditional formula (4), it is possible to reduce the total length of the imaging lens system and simultaneously stabilize its optical performance.

With the distinctive construction described above, it is possible to obtain an imaging lens system, and an imaging optical device provided with one, that, despite having a fast f-number, has extremely high optical performance combined with extremely fast focusing performance irrespective of the shooting distance. For example, it is possible to obtain an imaging lens system, and an imaging optical device provided with one, that, while being a large-diameter inner focus lens having a compact lens total length combined with suppressed variation of performance during focusing, can be effectively adapted to contract AF because of a reduced focusing group weight and a shortened focusing movement stroke. By using such an imaging lens system or imaging optical device in a digital appliance (e.g., digital camera), it is possible to furnish the digital appliance additionally with a high-performance image input function in a lightweight, compact fashion, contributing to making the digital appliance compact, low-cost, high-performance, versatile, etc. For example, an imaging lens system having the distinctive construction described above is suitable as an interchangeable lens for digital cameras and video cameras, and thus helps obtain a lightweight, compact interchangeable lens that is convenient to carry around. Conditions and other features for achieving such effects with a good balance and for achieving still higher optical performance, further weight and size reduction, etc. will now be described.

It is preferable that conditional formula (1a) below be fulfilled.

$$0.3 < P1/P < 0.55 \tag{1a}$$

Conditional formula (1a) defines, within the conditional range defined by conditional formula (1) above, a conditional range that is further preferable from the above-mentioned and other perspectives. Accordingly, preferably, fulfilling conditional formula (1a) helps enhance the above-mentioned effects.

It is preferable that conditional formula (2a) below be fulfilled.

$$0.4 < P1/P2 < 0.75 \tag{2a}$$

Conditional formula (2a) defines, within the conditional range defined by conditional formula (2) above, a conditional range that is further preferable from the above-mentioned and other perspectives. Accordingly, preferably, fulfilling conditional formula (2a) helps enhance the above-mentioned effects.

It is preferable that conditional formula (3a) below be fulfilled.

$$0.03 < t1/t < 0.08 \qquad (3a)$$

Conditional formula (3a) defines, within the conditional range defined by conditional formula (3) above, a conditional range that is further preferable from the above-mentioned and other perspectives. Accordingly, preferably, fulfilling conditional formula (3a) helps enhance the above-mentioned effects.

It is preferable that conditional formula (4a) below be fulfilled.

$$0.07 < t2/t < 0.12 \qquad (4a)$$

Conditional formula (4a) defines, within the conditional range defined by conditional formula (4) above, a conditional range that is further preferable from the above-mentioned and other perspectives. Accordingly, preferably, fulfilling conditional formula (4a) helps enhance the above-mentioned effects.

It is preferable that the rear group have at least one negative lens element. Providing at least one negative lens element in the rear group results in a negative lens element being arranged at a distance from a positive optical power, and this makes it possible to correct curvature of field effectively, and thereby to obtain uniform image quality up to the periphery of the image.

It is preferable that an aperture stop be provided in the first lens group. Arranging an aperture stop in the first lens group makes it possible to reduce the diameter of the entire imaging lens system, and simultaneously to reduce the diameter of the second lens group, which is the focusing lens group. It is further preferable that the aperture stop be arranged in the aerial distance t1, which is the longest among the axial lens surface-to-surface distances located on the image side of the position of half the total length of the first lens group within the first lens group. This eliminates the need to increase the total length to arrange the aperture stop, and thus helps make the imaging lens system compact.

It is preferable that, in the first lens group, three or more lens elements each having a positive optical power be arranged successively. By distributing a positive optical power among three or more lens elements, it is possible to bend rays gently, and this helps reduce occurrence of various aberrations including spherical aberration. It is further preferable that the number of lens elements arranged successively be four. Arranging four positive lens elements successively provides the effect of allowing effective aberration correction without making the total length excessively large.

It is preferable that at least one of the lens elements having a positive optical power in the first lens group fulfill conditional formula (5) below.

$$nd > 1.79 \qquad (5)$$

where
nd represents the refractive index for the d-line.

Using a positive lens element that fulfills conditional formula (5) makes it possible to reduce the total length and improve curvature of field. A lens material that fulfills conditional formula (5) is a high-refractive-index material and thus, by using a positive lens element that fulfills conditional formula (5), it is possible to make the curvature of the positive lens element gentler and suppress a sharp bend of rays even with the same optical power, and thereby to reduce the total length and reduce curvature of field.

It is preferable that conditional formula (5a) below be fulfilled.

$$nd > 1.85 \qquad (5a)$$

Conditional formula (5a) defines, within the conditional range defined by conditional formula (5) above, a conditional range that is further preferable from the above-mentioned and other perspectives. Accordingly, preferably, fulfilling conditional formula (5a) helps enhance the above-mentioned effects.

It is preferable that at least one of the lens elements having a positive optical power in the first lens group fulfill conditional formula (6) below.

$$vd > 55 \qquad (6)$$

where
vd represents the Abbe number for the d-line.

Using a positive lens element that fulfills conditional formula (6) makes it possible to effectively reduce the chromatic aberration occurring in the positive lens element. Because occurrence of axial chromatic aberration, in particular, can be reduced effectively, it is further preferable to use a positive lens element fulfilling conditional formula (6) as a constituent lens element of a cemented lens element.

It is preferable that conditional formula (6a) be fulfilled, and it is further preferable that conditional formula (6b) below be fulfilled.

$$vd > 60 \qquad (6a)$$

$$vd > 65 \qquad (6b)$$

Conditional formulae (6a) and (6b) define, within the conditional range defined by conditional formula (6) above, conditional ranges that are further preferable from the above-mentioned and other perspectives. Accordingly, preferably, fulfilling conditional formula (6a) or, further preferably, fulfilling conditional formula (6b) helps enhance the above-mentioned effects.

It is preferable that the second lens group have at least one positive lens element and at least one negative lens element. Providing a positive lens element and a negative lens element in the focusing group makes it possible to correct aberrations, such as curvature of field and chromatic aberration, within the focusing group. It is then possible to obtain an imaging lens system with small variation of performance during focusing, and thus to secure high image quality in the shortest-shooting-distance condition.

It is preferable that the second lens group be composed of three lens elements, specifically, from the object side, a positive lens element, a negative lens element, and a positive lens element. By composing the focusing group out of three lens elements, specifically a positive lens element, a negative lens element, and a positive lens element, it is possible not only to give the focusing group a compact diameter but also to effectively correct curvature of field and chromatic aberration within the focusing group.

It is preferable that conditional formula (7) below be fulfilled.

$$0.3 < P2/P < 0.95 \qquad (7)$$

where
P2 represents the optical power of the second lens group; and
P represents the optical power of the entire system in the infinity-object-distance condition.

Conditional formula (7) defines a preferred conditional range as to the optical power of the second lens group. Above the lower limit of conditional formula (7), the second lens group is prevented from having an excessively low optical power, and it is thus possible to reduce the movement stroke for focusing; this makes it possible to effectively increase the focusing speed. On the other hand, below the upper limit of conditional formula (7), the second lens group is prevented from having an excessively high optical power, and it is thus possible to reduce variation of aberrations such as astigmatism and curvature of field during focusing.

It is preferable that conditional formula (7a) below be fulfilled.

$$0.6 < P2/P < 0.85 \tag{7a}$$

Conditional formula (7a) defines, within the conditional range defined by conditional formula (7) above, a conditional range that is further preferable from the above-mentioned and other perspectives. Accordingly, preferably, fulfilling conditional formula (7a) helps enhance the above-mentioned effects.

It is preferable that the third lens group have a positive optical power. By giving the third lens group, which is the closest to the image sensor, a positive optical power, it is possible to reduce the total length while suppressing deterioration of performance.

It is preferable that conditional formula (8) below be fulfilled.

$$0.40 < (P1+P3)/P < 1.0 \tag{8}$$

where

P1 represents the optical power of the first lens group;
P3 represents the optical power of the third lens group; and
P represents the optical power of the entire system in the infinity-object-distance condition.

In the first and third lens groups, which remain stationary relative to the image surface, even when focusing is performed, how rays pass basically does not vary greatly; thus, variation of performance from infinity shooting to close-distance shooting is attributable in a large part to the second lens group. Accordingly, defining the proportion of the sum of the optical powers of the first and third lens groups in the optical power of the entire system makes it possible to arrange the optical power of the second lens group properly. That is, it is preferable that the ratio of the total optical power of the first and third lens groups to the optical power of the entire system fall within the range of conditional formula (8). From this perspective, conditional formula (8) defines a preferred range as to the optical powers of the first and third lens groups.

Above the lower limit of conditional formula (8), the second lens group is prevented from having an excessively high optical power in relative terms, and it is thus possible to reduce variation of aberrations such as astigmatism and curvature of field during focusing. On the other hand, below the upper limit of conditional formula (8), the second lens group is prevented from having an excessively low optical power in relative terms, and it is thus possible to reduce the movement stroke for focusing; this makes it possible to effectively increase the focusing speed. Moreover, the first and third lens groups are prevented from having excessively low optical powers, and thus it is possible to prevent the total length from being excessively large.

It is preferable that conditional formula (8a) be fulfilled.

$$0.45 < (P1+P3)/P < 0.8 \tag{8a}$$

Conditional formula (8a) defines, within the conditional range defined by conditional formula (8) above, a conditional range that is further preferable from the above-mentioned and other perspectives. Accordingly, preferably, fulfilling conditional formula (8a) helps enhance the above-mentioned effects.

The imaging lens system described above is suitable for use as an imaging lens for digital appliances equipped with an image input function (e.g., interchangeable-lens digital cameras), and can be combined with an image sensor or the like to build an imaging optical device which optically takes in an image of a subject and which then outputs it in the form of an electrical signal. An imaging optical device is an optical device that forms the main component of cameras that are used to shoot still and moving images of subjects, and is composed of, for example, from the object side (i.e., subject side), an imaging lens system for forming an optical image of an object and an image sensor for converting the optical image formed by the imaging lens system into an electrical signal. By arranging the imaging lens system having the distinctive construction described above such that an optical image of a subject is formed on the light-receiving surface (i.e., imaging surface) of the image sensor, it is possible to build a compact, low-cost imaging optical device with high performance and a digital appliance provided with one.

Examples of digital appliances equipped with an image input function include cameras such as digital cameras, video cameras, surveillance cameras, security cameras, vehicle-mounted caners, and videophone cameras. Also included are personal computers, mobile digital appliances (e.g., mobile telephones, smartphones (high-functionality mobile telephones), tablet terminals, and mobile computers), peripheral devices (such as scanners, printers, and mice) for those, other digital appliances (such as driver recorders and defense appliances), etc., when these are provided with a camera function by incorporation or optional addition. As will be understood from these examples, not only is it possible to use an imaging optical device to build a camera, but it is also possible to incorporate an imaging optical device in various appliances to add a camera function to them. For example, it is possible to build a digital appliance equipped with an image input function, such as a camera-equipped mobile telephone.

Figure 21:
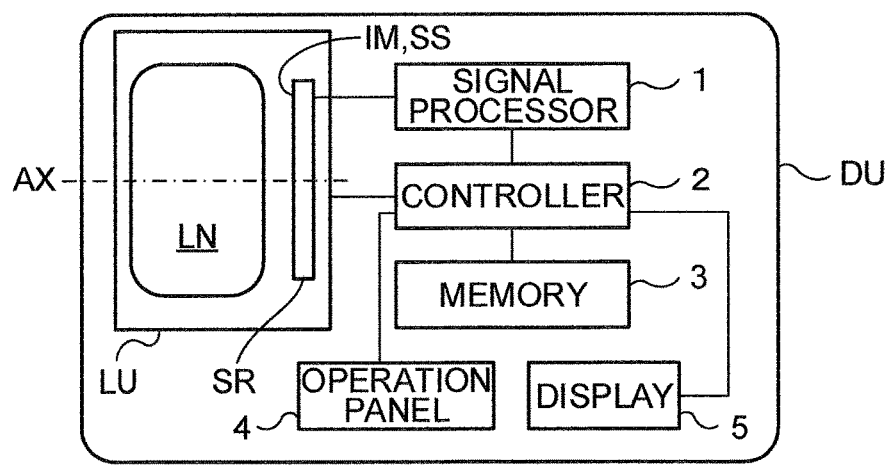
FIG. 21 is a schematic diagram showing an example of an outline of a configuration of a digital appliance incorporating an imaging optical device.

FIG. 21 shows, in a schematic cross section, an example of an outline of the configuration of a digital appliance DU as an example of a digital appliance equipped with an image input function. The digital appliance DU shown in FIG. 21 incorporates an imaging optical device LU, which includes, from the object side (i.e., subject side), an imaging lens system LN (AX representing the optical axis) for forming an optical image (image surface) IM of an object and an image sensor SR for converting the optical image IM formed on the light-receiving surface (imaging surface) SS by the imaging lens system LN into an electrical signal, and there is also arranged, as necessary, a plane-parallel plate (corresponding to, e.g., the cover glass of the image sensor SR; and optical filters and the like arranged as necessary, such as an optical low-pass filter and an infrared filter). When a digital appliance DU equipped with an image input function is built by use of the imaging optical device LU, the imaging optical device LU is usually arranged inside the body of the digital appliance DU; when implementing a camera function, it is possible to adopt a configuration that suits the needs. For example, an imaging optical device LU built as a unit can be configured to be detachably attached to, or rotatable relative to, the body of the digital appliance DU.

The imaging lens system LN is an imaging lens system of a three-group configuration, adopts an inner-focus design that achieves focusing from infinity to a close distance by moving the second lens group having a positive optical power toward the object side along the optical axis AX while keeping the first and third lens groups stationary, and forms an optical image IM on the light-receiving surface SS of the image sensor SR. Used as the image sensor SR is, for example, a solid-state image sensor, such as a CCD image sensor or a CMOS image sensor, that has a plurality of pixels. Since the imaging lens system LN is arranged such that the optical image IM of the subject is formed on the light-receiving surface SS, which is the photoelectric conversion portion of the image sensor SR, the optical image IM formed by the imaging lens system LN is converted into an electrical signal by the image sensor SR.

The digital appliance DU includes, in addition to the imaging optical device LU, a signal processor 1, a controller 2, a memory 3, an operation panel 4, a display 5, etc. The signal generated by the image sensor SR is subjected to predetermined digital image processing, image compression, etc. as necessary in the signal processor 1, and is, in the form of a digital video signal, recorded to the memory 3 (such as a semiconductor memory or an optical disc) and, as the case may be, transferred to another appliance (e.g., a communication function of a mobile telephone) via a cable or after being converted into an infrared signal or the like. The controller 2 comprises a microcomputer, and performs, in a concentrated fashion, control of functions such as shooting functions (still image shooting function, moving image shooting function) and image playback functions, and control of lens movement mechanisms for focusing, camera shake correction, etc. For example, the controller 2 controls the imaging optical device LU to make it perform at least one of shooting of a still image of a subject or shooting of a moving image of a subject. The display 5 includes a display device such as a liquid crystal monitor, and displays images by using an image signal resulting from conversion by the image sensor SR or image information recorded in the memory 3. The operation panel 4 includes operation members such as operation buttons (e.g., a shutter release button), operation dials (e.g., a shooting mode dial), etc., and conveys the information entered by user operation to the controller 2.

Next, by way of a first to a fifth embodiment of the imaging lens system LN, its optical construction will be described more specifically. FIGS. 1 to 5 are lens construction diagrams corresponding to the imaging lens system LN in the first to fifth embodiments respectively, each showing, in an optical section, the lens arrangement at a first focus position POS1 (in the infinity-object-distance condition) and a second focus position POS2 (in the shortest-object-distance condition). The first embodiment adopts a three-group construction of a positive-positive-negative type, and the second to fifth embodiments adopt a three-group construction of a positive-positive-positive type; for focusing, while the first lens group Gr1 and the third lens group Gr3 remain stationary, the second lens group Gr2 moves toward the object side along the optical axis AX. That is, the second lens group Gr2 is a focusing group, and moves toward the image side for focusing from an object at infinity to an object at a close distance as indicated by arrow mF. Accordingly, the aerial distance between the first and second lens groups Gr1 and Gr2 is largest at the first focus position POS1 (the aerial distance t2) and is smallest at the second focus position POS2.

In the first to fifth embodiments, the first lens group Gr1 is composed of a front group GrF having a positive optical power and a rear group GrR having a negative optical power (a two-group construction of a positive-negative type). When the first lens group Gr1 is divided into two lens groups across, as a boundary, the longest aerial distance t1 among the axial lens surface-to-surface distances located on the image side of the position of half the total length of the first lens group Gr1 within the first lens group Gr1, the object-side lens group is the front group GrF, and the image-side lens group is the rear group GrR. In both the front and rear groups GrF and GrR, the most image-side surface is a lens surface concave to the image side, and the rear group GrR is composed solely of a negative meniscus lens element concave to the image side. Between the front and rear groups GrF and GrR, an aperture stop ST is arranged.

In the first to fifth embodiments, the second lens group Gr2 is composed of, from the object side, a positive lens element L21, a negative lens element L22, and a positive lens element L23 (a three-element construction of a positive-negative-positive type). In the first, third, and fourth embodiments, the third lens group Gr3 is composed of, from the object-side, a negative lens element L31 and a positive lens element L32 (a two-element construction of a negative-positive type); in the second and fifth embodiments, the third lens group Gr3 is composed of, from the object-side, a positive lens element L31 and a negative lens element L32 (a two-element construction of a positive-negative type).

In the imaging lens system LN (FIG. 1) of the first embodiment, each lens group is composed of, from the object side, as follows. The front group GrF of the first lens group Gr1 is composed of a negative meniscus lens element L11 concave to the image side, a cemented lens element made up of a biconcave negative lens element L12 and a biconvex positive lens element L13, a biconvex positive lens element L14, a positive meniscus lens element L15 convex to the object side, and a negative meniscus lens element L16 concave to the image side. The rear group GrR of the first lens group Gr1 is composed solely of a negative meniscus lens element L17 concave to the image side. The second lens group Gr2 is composed of a positive meniscus lens element L21 convex to the object side (having aspherical surfaces on both sides), a biconcave negative lens element L22, and a biconvex positive lens element L23 (having aspherical surfaces on both sides). The third lens group Gr3 is composed of a negative meniscus lens element L31 concave to the object side and a positive meniscus lens element L32 convex to the image side.

In the imaging lens system LN (FIG. 2) of the second embodiment, each lens group is composed of, from the object side, as follows. The front group GrF of the first lens group Gr1 is composed of a negative meniscus lens element L11 concave to the image side, a cemented lens element made up of a biconcave negative lens element L12 and a biconvex positive lens element L13, a biconvex positive lens element L14, a biconvex positive lens element L15, a biconcave negative lens element L16, and a negative meniscus lens element L17 concave to the image side. The rear group GrR of the first lens group Gr1 is composed solely of a negative meniscus lens element L18 concave to the image side. The second lens group Gr2 is composed of a positive meniscus lens element L21 convex to the object side, a biconcave negative lens element L22, and a biconvex positive lens element L23 (having aspherical surfaces on both sides). The third lens group Gr3 is composed of a biconvex positive lens element L31 (having aspherical surfaces on both sides) and a plano-concave negative lens element L32 concave to the object side.

In the imaging lens system LN (FIG. 3) of the third embodiment, each lens group is composed of, from the object side, as follows. The front group GrF of the first lens group Gr1 is composed of a negative meniscus lens element L11 concave to the image side, a cemented lens element made up of a biconcave negative lens element L12 and a biconvex positive lens element L13, a biconvex positive lens element L14, a positive meniscus lens element L15 convex to the object side, and a cemented lens element made up of a biconvex positive lens element L16 and a biconcave negative lens element L17. The rear group GrR of the first lens group Gr1 is composed solely of a negative meniscus lens element L18 concave to the image side. The second lens group Gr2 is composed of a biconvex positive lens element L21, a biconcave negative lens element L22, and a biconvex positive lens element L23 (having aspherical surfaces on both sides). The third lens group Gr3 is composed of a negative meniscus lens element L31 concave to the image side and a biconvex positive lens element L32 (having aspherical surfaces on both sides).

In the imaging lens system LN (FIG. 4) of the fourth embodiment, each lens group is composed of, from the object side, as follows. The front group GrF of the first lens group Gr1 is composed of a negative meniscus lens element L11 concave to the image side, a cemented lens element made up of a biconcave negative lens element L12 and a biconvex positive lens element L13, a biconvex positive lens element L14, a positive meniscus lens element L15 convex to the object side, and a cemented lens element made up of a biconvex positive lens element L16 and a biconcave negative lens element L17. The rear group GrR of the first lens group Gr1 is composed solely of a negative meniscus lens element L18 concave to the image side. The second lens group Gr2 is composed of a positive meniscus lens element L21 convex to the object side, a negative meniscus lens element L22 concave to the object side, and a biconvex positive lens element L23 (having aspherical surfaces on both sides). The third lens group Gr3 is composed of a biconcave negative lens element L31 and a biconvex positive lens element L32 (having aspherical surfaces on both sides).

In the imaging lens system LN (FIG. 5) of the fifth embodiment, each lens group is composed of, from the object side, as follows. The front group GrF of the first lens group Gr1 is composed of a negative meniscus lens element L11 concave to the image side, a cemented lens element made up of a biconcave negative lens element L12 and a biconvex positive lens element L13, a biconvex positive lens element L14, a positive meniscus lens element L15 convex to the object side, and a cemented lens element made up of a biconvex positive lens element L16 and a biconcave negative lens element L17. The rear group GrR of the first lens group Gr1 is composed solely of a negative meniscus lens element L18 concave to the image side. The second lens group Gr2 is composed of a positive meniscus lens element L21 convex to the object side, a negative meniscus lens element L22 concave to the object side, and a biconvex positive lens element L23 (having aspherical surfaces on both sides). The third lens group Gr3 is composed of a biconvex positive lens element L31 (having aspherical surfaces on both sides) and a plano-concave negative lens element L32 concave to the object side.

EXAMPLES

Hereinafter, the construction and other features of imaging lens systems embodying the present invention will be described more specifically with reference to the construction data, etc. of practical examples. Examples 1 to 5 (EX1 to EX5) presented below are numerical examples corresponding to the first to fifth embodiments, respectively, described previously, and the lens construction diagrams (FIGS. 1 to 5) of the first to fifth embodiments also show the optical construction of the corresponding ones of Examples 1 to 5 respectively.

In the construction data of each practical example, listed as surface data are, from left to right, surface number i (OB representing the object surface, ST representing the aperture surface, and IM representing the image surface), paraxial radius of curvature r (mm), axial surface-to-surface distance d (mm), refractive index Nd for the d-lime (with a wavelength of 587.56 nm), and Abbe number vd for the d-line. For a variable axial surface-to-surface distance di (i representing the surface number; mm) that varies with focusing, its value at each of the first and second focus positions POS1 and POS2 is given.

A surface of which the surface number is marked with an asterisk (*) is an aspherical surface, and its surface shape is defined by formula (AS) below in the local rectangular coordinate system (x, y, z) having its origin at the vertex of the surface. Listed as aspherical surface data are aspherical surface coefficients, etc. In the aspherical surface data of each practical example, any unlisted coefficient equals zero, and for all the data, "E-n" stands for x "$10^{-n}$".

$$z=(c \cdot h^2)/\{1+\sqrt{[1-(1+K) \cdot c^2 \cdot h^2]}\}+\Sigma(Aj \cdot h^j) \quad (AS)$$

where h represents the height in a direction perpendicular to the z axis (optical axis AX) ($h^2=x^2+y^2$);

z represents the amount of sag in the optical axis AX direction at the height h (relative to the vertex of the surface);

c represents the curvature (the reciprocal of the radius of curvature r) at the vertex of the surface;

K represents the conic constant; and

Aj represents the aspherical surface coefficient of order j.

Listed as miscellaneous data are the focal length f (mm) of the entire system, f-number FNO, whole angle of view 2ω (°), maximum image height y' max (mm), lens total length TL (mm), back focus BF (mm), the focal length f1 (mm) of the first lens group Gr1, the focal length f2 (mm) of the second lens group Gr2, and the focal length f3 (mm) of the third lens group Gr3. Here, the back focus is given in terms of the air-equivalent length of the distance from the last lens surface to the paraxial image surface IM, and the lens total length TL equals the sum of the distance from the foremost lens surface to the last lens surface and the back focus BF. Table 1 shows values corresponding to the conditional formulae along with related data in each practical example.

FIGS. 6A to 6F, 7A to 7F, 8A to 8F, 9A to 9F, and 10A to 10F are longitudinal aberration diagrams corresponding to Examples 1 to 5 (EX1 to EX5) respectively. Of FIGS. 6A to 10F, those suffixed with "A" to "C" show aberrations at the first focus position POS1, and those suffixed with "D" to "F" show aberrations at the second focus position POS2. Of FIGS. 6A to 10F, those suffixed with "A" and "D" are spherical aberration diagrams, those suffixed with "B" and "E" are astigmatism diagrams, and those suffixed with "C" and "F" are distortion diagrams.

In the spherical aberration diagrams, a dash-and-dot line indicates the amount of spherical aberration for the C-line (with a wavelength of 656.28 nm), a solid line indicates the amount of spherical aberration for the d-line (with a wavelength of 587.56 nm), and a broken line indicates the amount of spherical aberration for the g-line (with a wavelength of 435.84 nm), all in terms of the deviation (mm) from the paraxial image surface in the optical axis AX direction, with the vertical axis representing the f-number. In the astigmatism diagrams, a broken line M indicates the meridional image surface for the d-line, and a solid line S indicates the sagittal image surface for the d-line, both in terms of the deviation (mm) from the paraxial image surface in the optical axis AX direction, with the vertical axis representing the image height Y' (mm). In the distortion diagrams, the horizontal axis represents the distortion (%) for the d-line, and the vertical axis represents the image height Y' (mm). The image height Y' corresponds to the maximum image height y' max on the image surface IM (i.e., one-half of the diagonal length of the light-receiving surface SS of the image sensor SR).

FIGS. 11A to 11F, 13A to 13F, 15A to 15F, 17A to 17F, and 19A to 19F are lateral aberration diagrams corresponding to Examples 1 to 5 (EX1 to EX5), respectively, at the first focus position POS1, and FIGS. 12A to 12F, 14A to 14F, 16A to 16F, 18A to 18F, and 20A to 20F are lateral aberration diagrams corresponding to Examples 1 to 5 (EX1 to EX5), respectively, at the second focus position POS2. Of FIGS. 11A to 20F, those suffixed with "A" to "C" show meridional coma (mm), and those suffixed with "D" to "F" show sagittal coma (mm), both at different image heights Y' (mm). As in the spherical aberration diagrams mentioned above, a dash-and-dot line relates to the C-line (with a wavelength of 656.28 nm), a solid line relates to the d-line (with a wavelength of 587.56 nm), and a broken line relates to the g-line (with a wavelength of 435.84 nm).

Example 1

Unit: mm

Surface Data

| i | r (mm) | d (mm) | Nd | vd |
|---|---|---|---|---|
| 0 (OB) | ∞ | ∞ | ~158.00 | |
| 1 | 89.678 | 2.50 | 1.7236 | 55.0 |
| 2 | 30.058 | 24.27 | | |
| 3 | −31.127 | 2.00 | 1.7637 | 27.3 |
| 4 | 48.439 | 13.22 | 1.7277 | 54.8 |
| 5 | −44.935 | 0.30 | | |
| 6 | 110.238 | 9.21 | 1.9300 | 22.0 |
| 7 | −93.297 | 0.30 | | |
| 8 | 40.391 | 8.45 | 1.7299 | 54.6 |
| 9 | 386.035 | 1.28 | | |
| 10 | 417.255 | 1.60 | 1.7249 | 28.6 |
| 11 | 43.165 | 7.69 | | |
| 12 (ST) | ∞ | 2.00 | | |
| 13 | 39.348 | 1.60 | 1.9300 | 22.0 |
| 14 | 32.525 | 13.33 | ~6.66 | |
| 15* | 43.619 | 4.31 | 1.7308 | 40.5 |
| 16* | 141.092 | 4.34 | | |
| 17 | −32.155 | 1.30 | 1.8081 | 22.8 |
| 18 | 119.706 | 3.18 | | |
| 19* | 69.704 | 7.00 | 1.7308 | 40.5 |
| 20* | −28.125 | 3.49 | ~10.16 | |
| 21 | −40.910 | 1.60 | 1.9300 | 22.0 |
| 22 | −99.981 | 0.50 | | |
| 23 | −155.000 | 4.54 | 1.8074 | 40.4 |
| 24 | −46.877 | 23.49 | | |
| 25 (IM) | ∞ | | | |

Unit: mm

Aspherical Surface Data

Surface 15

K = 0.00000E+00
A4 = −9.12283E−06
A6 = −1.58128E−08
A8 = −1.05413E−11
A10 = −2.82868E−13

Surface 16

K = 0.00000E+00
A4 = −1.66769E−05
A6 = −6.76994E−09
A8 = −2.71954E−11
A10 = −6.87133E−14

Surface 19

K = 0.00000E+00
A4 = −1.34442E−05
A6 = 5.25316E−09
A8 = 0.00000E+00
A10 = 0.00000E+00

Surface 20

K = 0.00000E+00
A4 = 3.82463E−06
A6 = −1.24179E−08
A8 = 1.98894E−11
A10 = −5.89532E−14

Miscellaneous Data f = 34.931
FNO. = 1.44
2ω = 66.02
y'max = 21.6
TL = 141.49
BF = 23.49
f1 = 67.886
f2 = 52.863
f3 = −7752.960

Example 2

Unit: mm

Surface Data

| i | r (mm) | d (mm) | Nd | vd |
|---|---|---|---|---|
| 0 (OB) | ∞ | ∞ | ~158.00 | |
| 1 | 221.544 | 1.60 | 1.6529 | 59.6 |
| 2 | 32.653 | 21.39 | | |
| 3 | −34.104 | 1.60 | 1.7588 | 27.0 |
| 4 | 53.881 | 11.59 | 1.7511 | 51.4 |
| 5 | −53.881 | 0.30 | | |
| 6 | 147.171 | 9.18 | 1.9289 | 22.1 |
| 7 | −78.012 | 0.30 | | |
| 8 | 46.737 | 8.63 | 1.7394 | 53.1 |
| 9 | −368.586 | 0.74 | | |
| 10 | −171.223 | 1.60 | 1.6696 | 32.3 |
| 11 | 124.596 | 0.96 | | |
| 12 | 121.789 | 1.60 | 1.7349 | 28.1 |
| 13 | 62.688 | 6.30 | | |
| 14 (ST) | ∞ | 1.50 | | |
| 15 | 39.716 | 1.60 | 1.9111 | 22.4 |
| 16 | 29.065 | 15.84 | ~6.66 | |
| 17 | 28.855 | 4.50 | 1.7292 | 54.7 |
| 18 | 63.221 | 4.39 | | |
| 19 | −174.397 | 1.30 | 1.8026 | 25.3 |
| 20 | 51.077 | 4.77 | | |
| 21* | 123.402 | 6.00 | 1.7308 | 40.5 |

-continued

| Unit: mm | | | | |
|---|---|---|---|---|
| 22* | −49.612 | 3.48 | ~10.16 | |
| 23* | 160.144 | 6.73 | 1.8074 | 40.4 |
| 24* | −48.801 | 0.50 | | |
| 25 | −56.892 | 1.60 | 1.9300 | 22.0 |
| 26 | ∞ | 23.52 | | |
| 27 (IM) | ∞ | | | |

Aspherical Surface Data

Surface 21

K = 0.00000E+00
A4 = −6.85594E−06
A6 = −2.49441E−08
A8 = 0.00000E+00
A10 = 0.00000E+00

Surface 22

K = 0.00000E+00
A4 = −1.02290E−06
A6 = −3.37115E−08
A8 = 5.56685E−11
A10 = −9.31598E−14

Surface 23

K = 0.00000E+00
A4 = −1.91502E−06
A6 = −1.26646E−08
A8 = 2.95197E−11
A10 = −3.66394E−14

Surface 24

K = 0.00000E+00
A4 = −6.33167E−07
A6 = −3.88608E−09
A8 = 0.00000E+00
A10 = 0.00000E+00

Miscellaneous Data f = 34.932
FNO. = 1.44
2ω = 66.30
y'max = 21.6
TL = 141.52
BF = 23.52
f1 = 135.959
f2 = 66.914
f3 = 184.811

Example 3

| Unit: mm | | | | |
|---|---|---|---|---|
| Surface Data | | | | |
| i | r (mm) | d (mm) | Nd | νd |
| 0 (OB) | ∞ | ∞ | ~258.00 | |
| 1 | 262.077 | 3.20 | 1.6180 | 63.4 |
| 2 | 32.284 | 22.99 | | |
| 3 | −31.141 | 3.20 | 1.8052 | 25.5 |
| 4 | 59.020 | 11.86 | 1.7725 | 49.6 |
| 5 | −47.340 | 0.30 | | |
| 6 | 107.712 | 8.39 | 1.9229 | 20.9 |
| 7 | −91.206 | 0.30 | | |
| 8 | 48.513 | 5.96 | 1.8042 | 46.5 |
| 9 | 121.143 | 1.13 | | |
| 10 | 99.753 | 7.09 | 1.4970 | 81.6 |
| 11 | −86.620 | 2.40 | 1.7847 | 25.7 |
| 12 | 174.957 | 4.44 | | |
| 13 (ST) | ∞ | 1.54 | | |
| 14 | 36.561 | 1.60 | 1.8467 | 23.8 |

-continued

| Unit: mm | | | | |
|---|---|---|---|---|
| 15 | 23.422 | 14.10 | ~8.13 | |
| 16 | 55.047 | 2.66 | 1.7234 | 38.0 |
| 17 | −2526.037 | 4.50 | | |
| 18 | −30.592 | 1.30 | 1.8052 | 25.5 |
| 19 | 175.456 | 2.18 | | |
| 20* | 138.556 | 7.00 | 1.7308 | 40.5 |
| 21* | −28.448 | 3.48 | ~9.46 | |
| 22 | 412.068 | 1.60 | 1.8467 | 23.8 |
| 23 | 52.964 | 1.55 | | |
| 24* | 61.068 | 5.24 | 1.8074 | 40.4 |
| 25* | −189.472 | 23.48 | | |
| 26 (IM) | ∞ | | | |

Aspherical Surface Data

Surface 20

K = 0.00000E+00
A4 = 1.76919E−06
A6 = 1.97882E−09
A8 = −5.72553E−12
A10 = 2.47498E−14

Surface 21

K = 0.00000E+00
A4 = 5.39507E−06
A6 = 6.00518E−09
A8 = −1.63658E−11
A10 = 5.85953E−14

Surface 24

K = 0.00000E+00
A4 = −5.39449E−06
A6 = 1.64107E−09
A8 = 1.05226E−11
A10 = 3.32679E−14

Surface 25

K = 0.00000E+00
A4 = −4.64267E−06
A6 = 3.20482E−10
A8 = 3.90580E−11
A10 = −5.83730E−14
A12 = 1.56080E−16

Miscellaneous Data f = 34.928
FNO. = 1.44
2ω = 66.34
y'max = 21.6
TL = 141.48
BF = 23.48
f1 = 79.341
f2 = 63.593
f3 = 254.429

Example 4

| Unit: mm | | | | |
|---|---|---|---|---|
| Surface Data | | | | |
| i | r (mm) | d (mm) | Nd | νd |
| 0 (OB) | ∞ | ∞ | ~259.52 | |
| 1 | 18931.519 | 3.20 | 1.5168 | 64.2 |
| 2 | 32.814 | 24.43 | | |
| 3 | −28.665 | 3.20 | 1.8467 | 23.8 |
| 4 | 190.595 | 10.78 | 1.8348 | 42.7 |
| 5 | −39.035 | 0.30 | | |
| 6 | 129.308 | 7.27 | 1.9229 | 20.9 |
| 7 | −99.038 | 0.30 | | |

-continued

Unit: mm

| i | r (mm) | d (mm) | Nd | vd |
|---|---|---|---|---|
| 8 | 48.348 | 3.57 | 1.8042 | 46.5 |
| 9 | 58.221 | 0.30 | | |
| 10 | 44.196 | 8.84 | 1.5928 | 68.6 |
| 11 | −160.937 | 2.40 | 1.8052 | 25.5 |
| 12 | 117.347 | 4.89 | | |
| 13 (ST) | ∞ | 2.80 | | |
| 14 | 51.208 | 1.60 | 1.8467 | 23.8 |
| 15 | 25.819 | 12.59 | ~6.85 | |
| 16 | 43.029 | 2.17 | 1.7234 | 38.0 |
| 17 | 76.039 | 6.33 | | |
| 18 | −27.288 | 1.30 | 1.8052 | 25.5 |
| 19 | −76.133 | 1.00 | | |
| 20* | 490.049 | 7.00 | 1.7308 | 40.5 |
| 21* | −28.327 | 3.45 | ~9.19 | |
| 22 | −182.410 | 1.60 | 1.9212 | 24.0 |
| 23 | 65.301 | 0.75 | | |
| 24* | 61.096 | 6.42 | 1.8074 | 40.4 |
| 25* | −80.356 | 23.50 | | |
| 26 (IM) | ∞ | | | |

Aspherical Surface Data

Surface 20

K = 0.00000E+00
A4 = 1.07032E−06
A6 = 2.10443E−09
A8 = −7.08199E−12
A10 = 8.42071E−14

Surface 21

K = 0.00000E+00
A4 = 6.44678E−06
A6 = 1.06067E−08
A8 = −4.43496E−11
A10 = 1.59120E−13

Surface 24

K = 0.00000E+00
A4 = −5.84651E−06
A6 = 2.02183E−08
A8 = −7.43287E−11
A10 = 1.91357E−13

Surface 25

K = 0.00000E+00
A4 = −3.49051E−06
A6 = 8.72883E−09
A8 = 2.49023E−11
A10 = −1.73432E−13
A12 = 5.39830E−16

Miscellaneous Data f = 35.122
FNO. = 1.44
2ω = 66.10
y'max = 21.6
TL = 139.98
BF = 23.50
f1 = 87.162
f2 = 58.847
f3 = 213.33

Example 5

Unit: mm

Surface Data

| i | r (mm) | d (mm) | Nd | vd |
|---|---|---|---|---|
| 0 (OB) | ∞ | ∞ | −259.52 | |
| 1 | 235.294 | 3.20 | 1.5168 | 64.2 |
| 2 | 31.299 | 26.88 | | |
| 3 | −26.967 | 3.20 | 1.8467 | 23.8 |
| 4 | 28171.365 | 10.46 | 1.8348 | 42.7 |
| 5 | −35.435 | 0.30 | | |
| 6 | 90.815 | 7.79 | 1.9229 | 20.9 |
| 7 | −126.369 | 0.30 | | |
| 8 | 201.531 | 2.45 | 1.8042 | 46.5 |
| 9 | 217.108 | 0.30 | | |
| 10 | 39.977 | 9.90 | 1.5928 | 68.6 |
| 11 | −111.591 | 2.40 | 1.8467 | 23.8 |
| 12 | 105.778 | 4.99 | | |
| 13 (ST) | ∞ | 2.91 | | |
| 14 | 47.654 | 1.60 | 1.8052 | 25.5 |
| 15 | 25.495 | 12.76 | ~6.38 | |
| 16 | 37.301 | 1.71 | 1.7433 | 49.2 |
| 17 | 50.867 | 5.98 | | |
| 18 | −26.973 | 1.30 | 1.8052 | 25.5 |
| 19 | −77.233 | 1.00 | | |
| 20* | 230.304 | 6.83 | 1.7308 | 40.5 |
| 21* | −29.024 | 3.44 | ~9.81 | |
| 22* | 741.136 | 4.71 | 1.8074 | 40.4 |
| 23* | −55.339 | 0.50 | | |
| 24 | −77.844 | 1.60 | 1.9229 | 20.9 |
| 25 | ∞ | 23.51 | | |
| 26 (IM) | ∞ | | | |

Aspherical Surface Data

Surface 20

K = 0.00000E+00
A4 = 2.37003E−07
A6 = −3.06261E−09
A8 = 2.65152E−12
A10 = 1.65677E−14

Surface 21

K = 0.00000E+00
A4 = 5.86403E−06
A6 = 7.29923E−10
A8 = −3.94280E−13
A10 = 2.01840E−14

Surface 22

K = 0.00000E+00
A4 = −6.05274E−06
A6 = 1.74111E−08
A8 = −8.78530E−11
A10 = 4.15160E−13
A12 = −2.97030E−16

Surface 23

K = 0.00000E+00
A4 = −3.67037E−06
A6 = 1.99563E−08
A8 = −6.92536E−11
A10 = 2.70690E−13

Miscellaneous Data f = 35.125
FNO. = 1.44
2ω = 66.16
y'max = 21.6
TL = 140.00
BF = 23.51

-continued

Unit: mm f1 = 83.889
f2 = 62.543
f3 = 255.748

TABLE 1

Conditional Formula

|     | (1) P1/P | (2) P1/P2 | (3) t1/t | (4) t2/t | (5) nd | (6) vd | (7) P2/P | (8) (P1 + P3)/P |
|-----|------|-------|------|------|-------|------|------|-------------|
| EX1 | 0.51 | 0.78 | 0.07 | 0.09 | 1.930 | —    | 0.66 | 0.51 |
| EX2 | 0.26 | 0.49 | 0.06 | 0.11 | 1.929 | —    | 0.52 | 0.45 |
| EX3 | 0.44 | 0.80 | 0.04 | 0.10 | 1.923 | 81.6 | 0.55 | 0.58 |
| EX4 | 0.40 | 0.68 | 0.05 | 0.09 | 1.923 | 68.6 | 0.60 | 0.57 |
| EX5 | 0.42 | 0.75 | 0.06 | 0.09 | 1.923 | 68.6 | 0.56 | 0.56 |

|     | P1 | P2 | P3 | P |
|-----|--------|--------|---------|--------|
| EX1 | 0.0147 | 0.0189 | −0.0001 | 0.0286 |
| EX2 | 0.0074 | 0.0149 | 0.0054  | 0.0286 |
| EX3 | 0.0126 | 0.0157 | 0.0039  | 0.0286 |
| EX4 | 0.0115 | 0.0170 | 0.0047  | 0.0285 |
| EX5 | 0.0119 | 0.0160 | 0.0039  | 0.0285 |

|     | t1 | t2 | t | nd | vd |
|-----|--------|--------|--------|--------|-------|
| EX1 | 9.6853 | 13.330 | 141.49 | 1.9300 | 55.00 |
| EX2 | 7.8016 | 15.841 | 141.52 | 1.9289 | 59.61 |
| EX3 | 5.9769 | 14.103 | 141.48 | 1.9229 | 81.61 |
| EX4 | 7.6866 | 12.585 | 139.98 | 1.9229 | 68.62 |
| EX5 | 7.8989 | 12.758 | 140.00 | 1.9229 | 68.62 |

What is claimed is:

1. An imaging lens system comprising, arranged in sequence from an object side, a first lens group having a positive optical power, a second lens group having a positive optical power, and a third lens group, wherein
during focusing, while the first and third lens groups remain stationary relative to an image surface, the second lens group moves,
when the first lens group is divided into two lens groups across, as a boundary, a longest aerial distance among axial lens-to-lens distances located on an image side of a position of half a total length of the first lens group within the first lens group, with the object-side lens group called a front group and the image-side lens group called a rear group, then a surface at a most image-side position in the front group is a lens surface concave to the image side, and a surface at a most image-side position in the rear group is a lens surface concave to the image side, and
conditional formulae (1) to (4) below are fulfilled:

$$0.2<P1/P<0.6 \quad (1)$$

$$0.3<P1/P2<0.9 \quad (2)$$

$$0.03<t1/t<0.1 \quad (3)$$

$$0.05<t2/t<0.14 \quad (4)$$

where
P1 represents an optical power of the first lens group;
P2 represents an optical power of the second lens group;
P represents an optical power of the entire system;
t1 represents the longest aerial distance among the axial lens-to-lens distances located on the image side of the position of half the total length of the first lens group within the first lens group;
t2 represents an aerial distance between the first and second lens groups in an infinity-object-distance condition; and
t represents a total length of the imaging lens system.

2. The imaging lens system of claim 1, wherein the rear group includes at least one negative lens element.

3. The imaging lens system of claim 1, wherein an aperture stop is provided in the first lens group.

4. The imaging lens system of claim 1, wherein in the first lens group, three or more lens elements each having a positive optical power are arranged successively.

5. The imaging lens system of claim 1, wherein at least one of lens elements having a positive optical power in the first lens group fulfills conditional formula (5) below:

$$nd>1.79 \quad (5)$$

where
nd represents a refractive index for a d-line.

6. The imaging lens system of claim 1, wherein
at least one of lens elements having a positive optical power in the first lens group fulfills conditional formula (6) below:

$$vd>55 \quad (6)$$

where
vd represents an Abbe number for a d-line.

7. The imaging lens system of claim 1, wherein the second lens group includes at least one positive lens element and at least one negative lens element.

8. The imaging lens system of claim 1, wherein the second lens group is composed of three lens elements that are, from the object side, a positive lens element, a negative lens element, and a positive lens element.

9. The imaging lens system of claim 1, wherein conditional formula (7) below is fulfilled:

$$0.3<P2/P<0.95 \quad (7)$$

where
P2 represents the optical power of the second lens group; and
P represents an optical power of the entire system in the infinity-object-distance condition.

10. The imaging lens system of claim 1, wherein the third lens group has a positive optical power.

11. The imaging lens system of claim 1, wherein conditional formula (8) below is fulfilled:

$$0.40<(P1+P3)/P<1.0 \quad (8)$$

where
P1 represents the optical power of the first lens group;
P3 represents an optical power of the third lens group; and
P represents an optical power of the entire system in the infinity-object-distance condition.

12. An imaging optical device comprising the imaging lens system of claim 1 and an image sensor for converting an optical image formed on an imaging surface into an electrical signal, wherein
the imaging lens system is arranged such that an optical image of a subject is formed on an imaging surface of the image sensor.

13. A digital appliance comprising the imaging optical device of claim 12 so as to be additionally provided with at least one of a function of shooting a still image of the subject or a function of shooting a moving image of the subject.

* * * * *